United States Patent
Nishiwaki

(10) Patent No.: US 8,350,920 B2
(45) Date of Patent: Jan. 8, 2013

(54) IMAGE CAPTURING APPARATUS, IMAGE CAPTURING METHOD, IMAGE PROCESSING APPARATUS, IMAGE PROCESSING METHOD, AND PROGRAM CAPABLE OF HIDING DESIRED CHARACTER INFORMATION AND RESTORING THE HIDDEN CHARACTER INFORMATION

(75) Inventor: Kazuhiko Nishiwaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1461 days.

(21) Appl. No.: 11/766,324

(22) Filed: Jun. 21, 2007

(65) Prior Publication Data

US 2008/0012873 A1  Jan. 17, 2008

(30) Foreign Application Priority Data

Jul. 11, 2006 (JP) ................. 2006-190640

(51) Int. Cl.
*H04N 5/235* (2006.01)
*H04N 5/228* (2006.01)

(52) U.S. Cl. .................................. 348/222.1

(58) Field of Classification Search ............ 380/54, 380/200, 205, 207, 208, 210; 382/282; 348/222.1
See application file for complete search history.

(56) References Cited

U.S. PATENT DOCUMENTS

| | | | | | |
|---|---|---|---|---|---|
| 5,903,309 | A | * | 5/1999 | Anderson | 348/333.02 |
| 6,005,936 | A | * | 12/1999 | Shimizu et al. | 713/176 |
| 6,636,638 | B1 | | 10/2003 | Yamaguchi | |
| 6,744,461 | B1 | * | 6/2004 | Wada et al. | 348/143 |
| 7,319,755 | B2 | * | 1/2008 | Struyk | 380/213 |
| 2003/0118183 | A1 | * | 6/2003 | Struyk | 380/213 |
| 2004/0042634 | A1 | * | 3/2004 | Cazier | 382/100 |
| 2004/0081338 | A1 | * | 4/2004 | Takenaka | 382/118 |

FOREIGN PATENT DOCUMENTS

| | | | |
|---|---|---|---|
| EP | 1 003 325 A2 | | 5/2000 |
| EP | 1003325 | | 5/2000 |
| JP | 2003-319158 | * | 7/2003 |
| JP | 2003-319158 | | 11/2003 |
| JP | 2004-7100 | | 1/2004 |
| JP | 2004-40178 | | 2/2004 |
| JP | 2005-18220 | | 1/2005 |
| JP | 2006-133874 | | 5/2006 |
| JP | 2006-345264 | | 12/2006 |

* cited by examiner

*Primary Examiner* — Nicholas Giles
(74) *Attorney, Agent, or Firm* — Oblon, Spivak, McClelland, Maier & Neustadt, L.L.P.

(57) ABSTRACT

An image capturing apparatus to capture an image of a subject includes an extracting unit configured to extract a character area image of an area including a character from a captured subject image; a converting unit configured to convert the character area image in accordance with a first predetermined method; a first generating unit configured to generate a hiding image to make the character area image unrecognizable to a user; an encoding unit configured to encode the subject image in which the character area image is overwritten with the generated hiding image in accordance with a second predetermined method; and a second generating unit configured to generate a file including area information specifying the area, converted character area image information obtained through the conversion, and subject image information obtained through the encoding.

16 Claims, 15 Drawing Sheets

FIG. 5
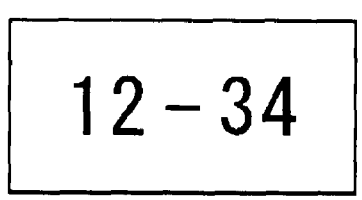 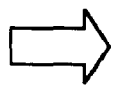 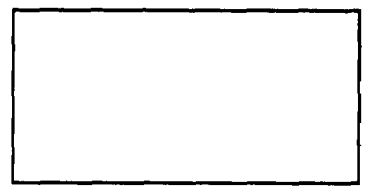
SINGLE COLOR
ICON
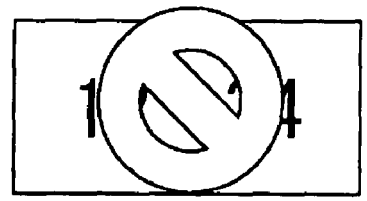
MOSAIC
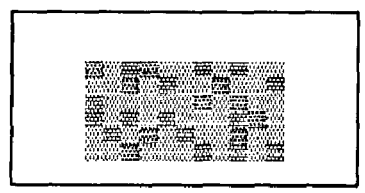

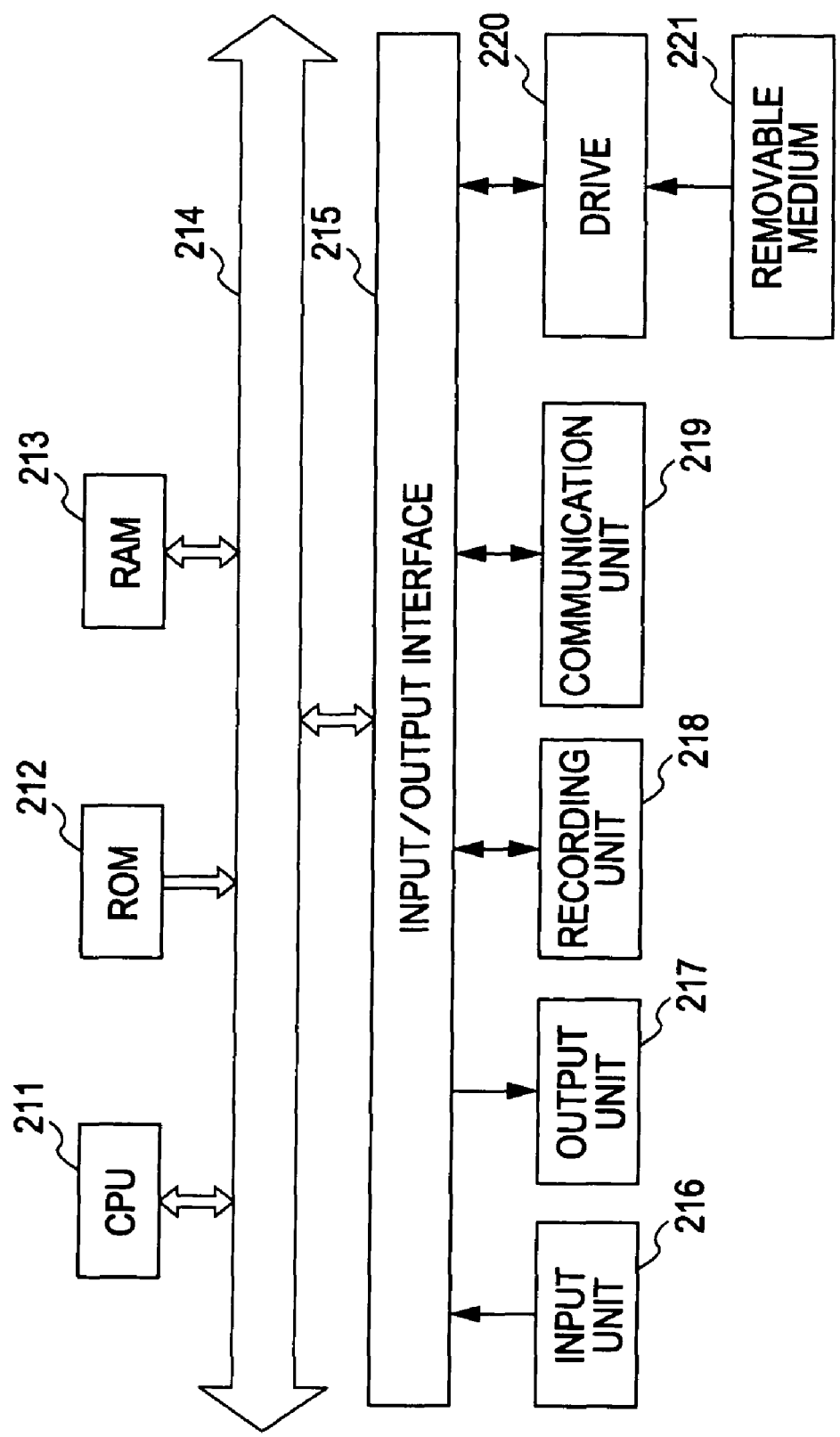

IMAGE CAPTURING APPARATUS, IMAGE CAPTURING METHOD, IMAGE PROCESSING APPARATUS, IMAGE PROCESSING METHOD, AND PROGRAM CAPABLE OF HIDING DESIRED CHARACTER INFORMATION AND RESTORING THE HIDDEN CHARACTER INFORMATION

CROSS REFERENCES TO RELATED APPLICATIONS

The present invention contains subject matter related to Japanese Patent Application JP 2006-190640 filed in the Japanese Patent Office on Jul. 11, 2006, the entire contents of which are incorporated herein by reference.

BACKGROUND OF THE INVENTION

1. Field of the Invention

The present invention relates to an image capturing apparatus, an image capturing method, an image processing apparatus, an image processing method, and a program. Particularly, the present invention relates to an image capturing apparatus, an image capturing method, an image processing apparatus, an image processing method, and a program capable of hiding desired character information and restoring the hidden character information.

2. Description of the Related Art

When a user releases an image captured by a digital still camera or the like on the Internet and allows someone to browse the image, the user may want to hide character information that can include personal information in the image so that the character information is not read by anyone.

In that case, the user typically performs image processing, e.g., with a mosaic pattern or painting, on the character information by using an image editing software installed in a personal computer.

For example, in an image processing apparatus disclosed in Patent Document 1 (Japanese Unexamined Patent Application Publication No. 2004-7100), an original image is combined with a character-string image and the composite image generated accordingly is compressed and stored. At the same time, the part in the original image that is to be embedded with the character-string image is compressed and recorded as an image for restoring the original image, and the character-string image is replaced by the image for restoring the original image at restoration of the composite image.

SUMMARY OF THE INVENTION

In the conventional method, however, when the user wants to prevent character information from being read by someone, the user manually specifies the position of the character information in the image. This operation requires much time if the amount of the character information is large. Furthermore, it may be impossible to restore the character information after being processed.

In the image processing apparatus disclosed in Patent Document 1, the part in the original image that is to be embedded with the character-string image is compressed and recorded before the character-string image is embedded there, so that the image not embedded with the character-string image can be restored. However, it may be impossible to hide arbitrary character information in the image, and thus personal information can leak.

The present invention has been made in view of these circumstances and is directed to hiding desired character information such that the hidden character information can be restored.

According to an embodiment of the present invention, there is provided an image capturing apparatus to capture an image of a subject. The image capturing apparatus includes extracting means for extracting a character area image of an area including a character from a captured subject image; converting means for converting the character area image in accordance with a first predetermined method; first generating means for generating a hiding image to make the character area image unrecognizable to a user; encoding means for encoding the subject image in which the character area image is overwritten with the generated hiding image in accordance with a second predetermined method; and second generating means for generating a file including area information specifying the area, converted character area image information obtained through the conversion, and subject image information obtained through the encoding.

The hiding image may be an image of a predetermined single color, a predetermined icon, or an image made by applying a mosaic pattern on the character area image.

The area information may include information indicating a starting point, information indicating sizes in horizontal and vertical directions from the starting point, and an ID identifying the area in the subject image.

The file may include at least header information, the subject image information, and one or a plurality of pieces of the area information and the converted character area image information.

The first method may be an encrypting JPEG method, and the converting means may perform encryption in accordance with the encrypting JPEG method.

The second method may be a JPEG method, and the encoding means may perform compression in accordance with the JPEG method.

According to an embodiment of the present invention, there is provided an image capturing method for an image capturing apparatus to capture an image of a subject. The image capturing method includes the steps of extracting a character area image of an area including a character from a captured subject image; converting the character area image in accordance with a first predetermined method; generating a hiding image to make the character area image unrecognizable to a user; encoding the subject image in which the character area image is overwritten with the generated hiding image in accordance with a second predetermined method; and generating a file including area information specifying the area, converted character area image information obtained through the conversion, and subject image information obtained through the encoding.

According to an embodiment of the present invention, there is provided a program allowing a computer to execute an image capturing process of an image capturing apparatus to capture an image of a subject. The program includes the steps of extracting a character area image of an area including a character from a captured subject image; converting the character area image in accordance with a first predetermined method; generating a hiding image to make the character area image unrecognizable to a user; encoding the subject image in which the character area image is overwritten with the generated hiding image in accordance with a second predetermined method; and generating a file including area information specifying the area, converted character area image information obtained through the conversion, and subject image information obtained through the encoding.

In the above-described image capturing apparatus, image capturing method, and program, a character area image of an area including a character is extracted from a captured subject image; the character area image is converted in accordance with a first predetermined method; a hiding image to make the character area image unrecognizable to a user is generated; the subject image in which the character area image is overwritten with the generated hiding image is encoded in accordance with a second predetermined method; and a file including area information specifying the area, converted character area image information obtained through the conversion, and subject image information obtained through the encoding is generated.

According to an embodiment of the present invention, there is provided an image processing apparatus to reproduce a captured subject image on the basis of a file including area information specifying an area including a character extracted from the captured subject image, converted character area image information obtained by converting a character area image in the area, and subject image information obtained by encoding the subject image. The image processing apparatus includes decoding means for decoding the subject image information in accordance with a first predetermined method; reading means for reading the area information and the converted character area image information from the file; converting means for converting the read converted character area image information in accordance with a second predetermined method; overwriting means for overwriting the area in the subject image obtained by the decoding with the character area image that has been restored to an original state by converting the converted character area image information in accordance with the read area information; and display control means for controlling display of the subject image in which overwriting with the character area image has been performed on a screen.

The area information may include information indicating a starting point, information indicating sizes in horizontal and vertical directions from the starting point, and an ID identifying the area in the subject image.

The first method may be a JPEG method, and the decoding means may perform decompression in accordance with the JPEG method.

The second method may be an encrypting JPEG method, and the converting means may perform decoding in accordance with the encrypting JPEG method.

According to an embodiment of the present invention, there is provided an image processing method for an image processing apparatus to reproduce a captured subject image on the basis of a file including area information specifying an area including a character extracted from the captured subject image, converted character area image information obtained by converting a character area image in the area, and subject image information obtained by encoding the subject image. The image processing method includes the steps of decoding the subject image information in accordance with a first predetermined method; reading the area information and the converted character area image information from the file; converting the read converted character area image information in accordance with a second predetermined method; overwriting the area in the subject image obtained by the decoding with the character area image that has been restored to an original state by converting the converted character area image information in accordance with the read area information; and controlling display of the subject image in which overwriting with the character area image has been performed on a screen.

According to an embodiment of the present invention, there is provided a program allowing a computer to execute image processing of an image processing apparatus to reproduce a captured subject image on the basis of a file including area information specifying an area including a character extracted from the captured subject image, converted character area image information obtained by converting a character area image in the area, and subject image information obtained by encoding the subject image. The program includes the steps of decoding the subject image information in accordance with a first predetermined method; reading the area information and the converted character area image information from the file; converting the read converted character area image information in accordance with a second predetermined method; overwriting the area in the subject image obtained by the decoding with the character area image that has been restored to an original state by converting the converted character area image information in accordance with the read area information; and controlling display of the subject image in which overwriting with the character area image has been performed on a screen.

In the above-described image processing apparatus, image processing method, and program, subject image information that is obtained by encoding a captured subject image is decoded in accordance with a first predetermined method; area information and converted character area image information are read from a file including the area information specifying an area including a character extracted from the captured subject image, the converted character area image information obtained by converting a character area image in the area, and the subject image information; the read converted character area image information is converted in accordance with a second predetermined method; the area in the subject image obtained by the decoding is overwritten with the character area image that has been restored to an original state by converting the converted character area image information in accordance with the read area information; and display of the subject image in which overwriting with the character area image has been performed on a screen is controlled.

As described above, according to an embodiment of the present invention, desired character information can be hidden. Particularly, desired character information can be hidden without specifying the character information to be hidden.

According to an embodiment of the present invention, the hidden character information can be restored.

BRIEF DESCRIPTION OF THE DRAWINGS

FIG. 5 shows an example of a character area image;

FIG. 16 is a block diagram showing an example of a configuration of a personal computer executing a program according to an embodiment of the present invention.

DESCRIPTION OF THE PREFERRED EMBODIMENTS

Figure 1:
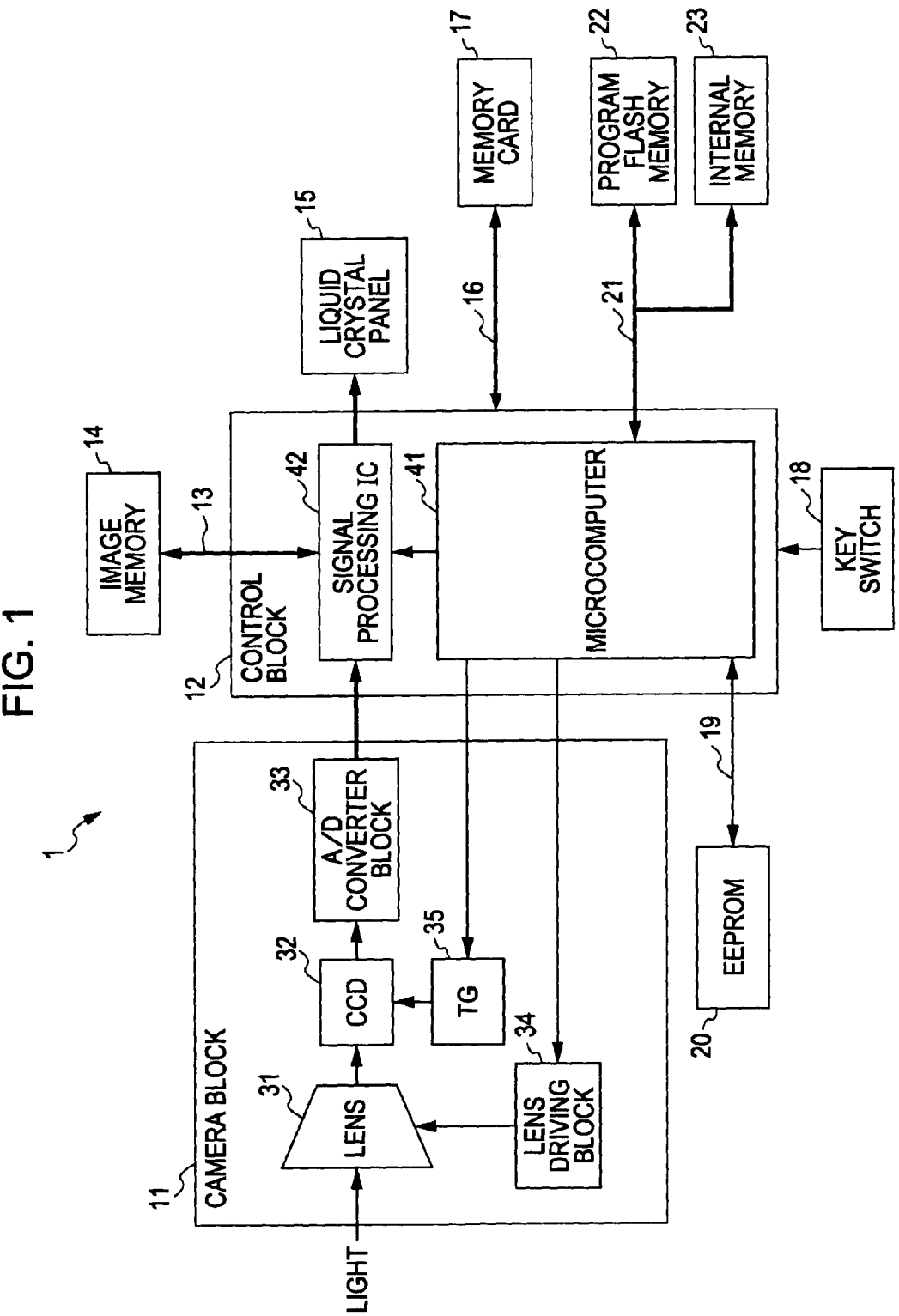
FIG. 1 is a block diagram showing a hardware configuration of a digital still camera according to an embodiment of the present invention.

Before describing embodiments of the present invention, the correspondence between the features of the claims and the specific elements in the embodiments described in the specification or drawings is discussed below. This description is intended to assure that the embodiments supporting the present invention are described in the specification or drawings. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An image capturing apparatus according to an embodiment of the present invention is an image capturing apparatus (e.g., the digital still camera 1 shown in FIG. 6) to capture an image of a subject. The image capturing apparatus includes extracting means (e.g., the character area image extracting unit 111 shown in FIG. 6) for extracting a character area image of an area including a character from a captured subject image; converting means (e.g., the character area image converting unit 112 shown in FIG. 6) for converting the character area image in accordance with a first predetermined method; first generating means (e.g., the hiding image generating unit 114 shown in FIG. 6) for generating a hiding image to make the character area image unrecognizable to a user; encoding means (e.g., the image encoding unit 116 shown in FIG. 6) for encoding the subject image in which the character area image is overwritten with the generated hiding image in accordance with a second predetermined method; and second generating means (e.g., the image compressed file generating unit 117 shown in FIG. 6) for generating a file including area information specifying the area, converted character area image information obtained through the conversion, and subject image information obtained through the encoding.

The hiding image may be an image of a predetermined single color, a predetermined icon, or an image made by applying a mosaic pattern on the character area image.

The area information may include information indicating a starting point, information indicating sizes in horizontal and vertical directions from the starting point, and an ID identifying the area in the subject image.

The file may include at least header information, the subject image information, and one or a plurality of pieces of the area information and the converted character area image information.

The first method may be an encrypting JPEG method, and the converting means may perform encryption in accordance with the encrypting JPEG method.

The second method may be a JPEG method, and the encoding means may perform compression in accordance with the JPEG method.

An image capturing method or a program according to an embodiment of the present invention is an image capturing method for an image capturing apparatus to capture an image of a subject or a program allowing a computer to execute an image capturing process of an image capturing apparatus to capture an image of a subject. The method or the program includes the steps of extracting a character area image of an area including a character from a captured subject image (e.g., step S32 in FIG. 8); converting the character area image in accordance with a first predetermined method (e.g., step S34 in FIG. 8); generating a hiding image to make the character area image unrecognizable to a user (e.g., step S36 in FIG. 8); encoding the subject image in which the character area image is overwritten with the generated hiding image in accordance with a second predetermined method (e.g., step S17 in FIG. 7); and generating a file including area information specifying the area, converted character area image information obtained through the conversion, and subject image information obtained through the encoding (e.g., step S19 in FIG. 7).

An image processing apparatus according to an embodiment of the present invention is an image processing apparatus (e.g., the digital still camera 1 shown in FIG. 13) to reproduce a captured subject image on the basis of a file including area information specifying an area including a character extracted from the captured subject image, converted character area image information obtained by converting a character area image in the area, and subject image information obtained by encoding the subject image. The image processing apparatus includes decoding means (e.g., the image decoding unit 151 shown in FIG. 13) for decoding the subject image information in accordance with a first predetermined method; reading means (e.g., the character area data reading unit 152 shown in FIG. 13) for reading the area information and the converted character area image information from the file; converting means (e.g., the converted character area image converting unit 153 shown in FIG. 13) for converting the read converted character area image information in accordance with a second predetermined method; overwriting means (e.g., the character area image overwriting unit 154 shown in FIG. 13) for overwriting the area in the subject image obtained by the decoding with the character area image that has been restored to an original state by converting the converted character area image information in accordance with the read area information; and display control means (e.g., the display control unit 155 shown in FIG. 13) for controlling display of the subject image in which overwriting with the character area image has been performed on a screen.

The area information may include information indicating a starting point, information indicating sizes in horizontal and vertical directions from the starting point, and an ID identifying the area in the subject image.

The first method may be a JPEG method, and the decoding means may perform decompression in accordance with the JPEG method.

The second method may be an encrypting JPEG method, and the converting means may perform decoding in accordance with the encrypting JPEG method.

An image processing method or a program according to an embodiment of the present invention is an image processing method for an image processing apparatus to reproduce a captured subject image on the basis of a file including area information specifying an area including a character extracted from the captured subject image, converted character area image information obtained by converting a character area image in the area, and subject image information obtained by encoding the subject image, or a program allowing a computer to execute image processing of an image processing apparatus to reproduce a captured subject image on the basis of a file including area information specifying an area including a character extracted from the captured subject image, converted character area image information obtained by converting a character area image in the area, and subject image information obtained by encoding the subject image. The method or the program includes the steps of decoding the subject image information in accordance with a first predetermined method (e.g., step S73 in FIG. 14); reading the area information and the converted character area image information from the file (e.g., step S93 in FIG. 15); converting the read converted character area image information in accordance with a second predetermined method (e.g., step S94 in FIG. 15); overwriting the area in the subject image obtained by the decoding with the character area image that has been restored to an original state by converting the converted character area image information in accordance with the read area information (e.g., step S95 in FIG. 15); and controlling display of the subject image in which overwriting with the character area image has been performed on a screen (e.g., step S78 in FIG. 14).

The above-described programs can be recorded on a recording medium (e.g., the removable medium 221 shown in FIG. 16).

Hereinafter, an embodiment of the present invention is described with reference to the drawings.

FIG. 1 is a block diagram showing a hardware configuration of a digital still camera 1 according to an embodiment of the present invention.

The digital still camera 1 includes a camera block 11, a control block 12, an image memory 14, a liquid crystal panel 15, a key switch 18, an EEPROM (electrically erasable and programmable read only memory) 20, a program flash memory 22, and an internal memory 23. Also, a memory card 17 is loaded into the digital still camera 1 as necessary.

The control block 12 connects to the image memory 14 via a memory bus 13, the control block 12 connects to the program flash memory 22 and the internal memory 23 via a host bus 21, and the control block 12 connects to the EEPROM 20 via an SIO (serial input/output) 19. Also, the control block 12 connects to the memory card 17 via a card bus 16.

The camera block 11 includes an imaging device and an optical system, such as a lens to form an image on the imaging device. The camera block 11 forms an image of a subject and performs photoelectric conversion on the formed image so as to generate image data corresponding to the image. The camera block 11 then supplies the generated image data to the control block 12.

The camera block 11 includes a lens 31, a CCD (charge-coupled device) 32, an A/D (analog to digital) converter block 33, a lens driving block 34, and a timing generator (TG) 35.

The lens 31 includes, for example, an optical lens, a focus mechanism, a shutter mechanism, and an iris mechanism. The lens 31 collects light reflected from a subject (an optical image), that is, allows the light of the image of the subject to be focused on a light receiving unit of the CCD 32. The lens 31 is driven by the lens driving block 34, which is controlled by the control block 12.

The CCD 32 includes a CCD sensor and operates in accordance with timing signals supplied from the timing generator (TG) 35, which is controlled by the control block 12, so as to perform photoelectric conversion on the light from the subject entering through the lens 31 and to supply analog image signals as electric signals based on the amount of received light to the A/D converter block 33. The CCD 32 is not limited to the CCD sensor, but another type of imaging device to generate image signals in units of pixels can be used. For example, a CMOS (complementary metal oxide semiconductor) sensor can be used.

The A/D converter block 33 performs A/D conversion on analog image signals from the CCD 32 so as to generate digital image signals, and supplies image data based on the digital image signals to the control block 12.

The control block 12 controls the respective units in the digital still camera 1.

The control block 12 includes a microcomputer 41 and a signal processing IC (integrated circuit) 42.

The microcomputer 41 executes various processes in accordance with a program stored in the program flash memory 22 or a program loaded in the internal memory 23 via the host bus 21 on the basis of operation signals supplied from the key switch 18. The internal memory 23 also stores data that is necessary for the microcomputer 41 to execute the various processes.

The EEPROM 20 stores various parameters used in a process executed by the microcomputer 41 and various data such as information about a user. The microcomputer 41 reads various data from the EEPROM 20 via the SIO 19 and executes various processes by using the data. In this embodiment, the EEPROM 20 can be replaced by the image memory 14, the program flash memory 22, or the internal memory 23.

The microcomputer 41 controls the operation of the lens 31 via the lens driving block 34 and controls the operation of the CCD 32 via the timing generator (TG) 35, so as to control the drive of the camera block 11.

Also, the microcomputer 41 controls the signal processing IC 42. The signal processing IC 42 performs digital signal processing, such as denoising, on the image data supplied from the A/D converter block 33 in accordance with the control by the microcomputer 41 and supplies the image data to the liquid crystal panel 15, which displays the image data. At this time, the signal processing IC 42 allows the image memory 14 to store the image data in accordance with the control by the microcomputer 41 and performs digital signal processing on the image data. That is, a memory controller block to read/write data from/on the image memory 14 is provided in the signal processing IC 42. The memory controller reads image data and menu data from the image memory 14, combines (adds) those data, and displays the composite data on the liquid crystal panel 15.

The signal processing IC 42 compresses the image data from the A/D converter block 33 in a predetermined method, such as the JPEG (Joint Photographic Experts Group) method, and records the compressed image data on the memory card 17 via the card bus 16. Also, the signal processing IC 42 decompresses the compressed image data recorded on the memory card 17 via the card bus 16 and supplies the decompressed image data to the liquid crystal panel 15, which displays the image data. At this time, the signal processing IC 42 appropriately stores the image data in the image memory 14 and compresses or decompresses the image data.

The memory card 17 is an example of a recording device attachable to the digital still camera 1. Alternatively, another type of removable recording medium, such as a DVD (digital versatile disc) or a hard disk, may be used. However, the memory card 17 is adopted as an example in this embodiment.

Hereinafter, procedures of data processing during recording (also referred to as during capturing) of a still image and during reproducing of a still image in the digital still camera 1 shown in FIG. 1 are described with reference to FIGS. 2 and 3.

First, the procedure of data processing during capturing of a still image in the digital still camera 1 is described with reference to FIG. 2.

Figure 2:
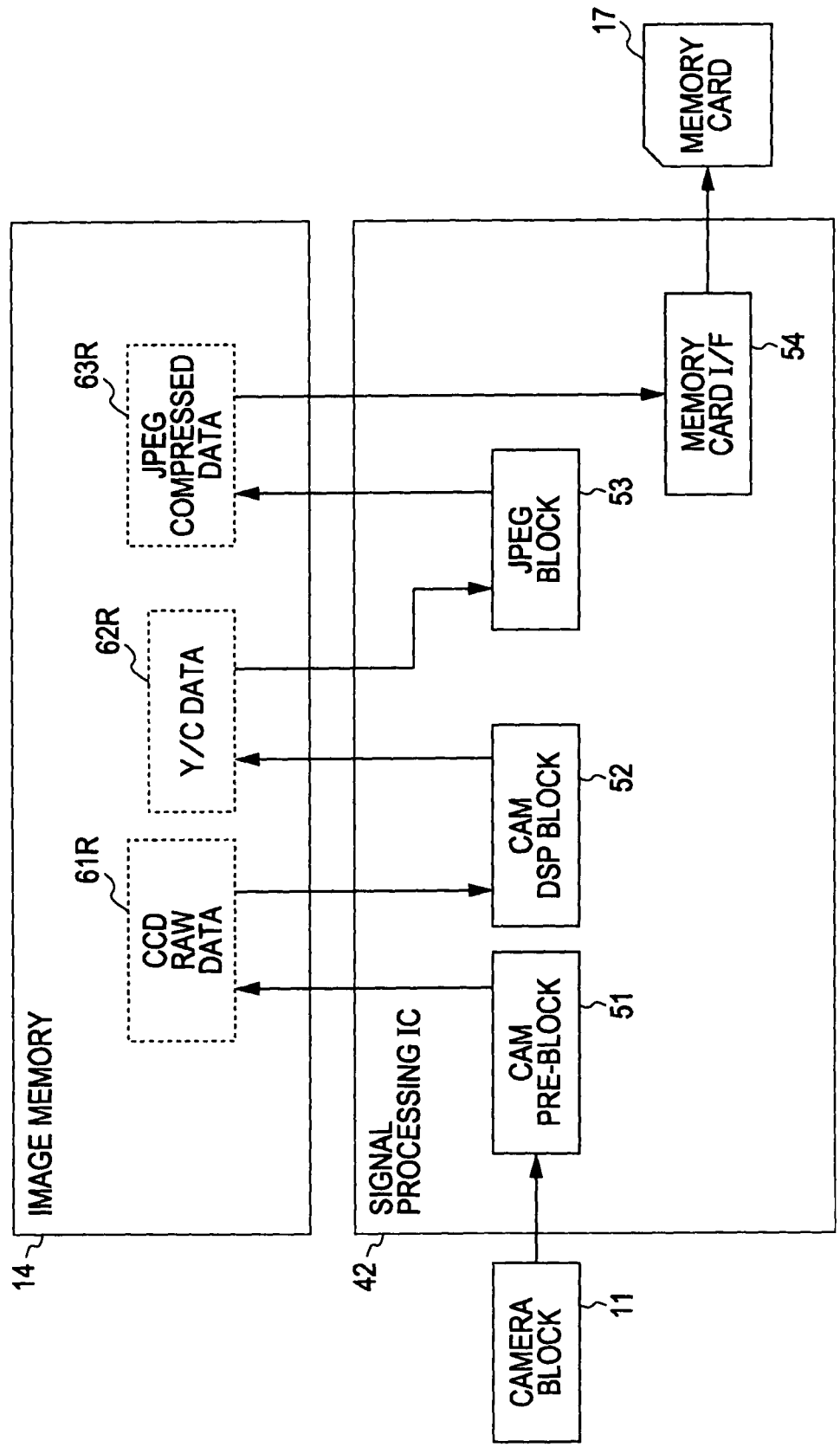
FIG. 2 illustrates a procedure of data processing during capturing of a still image by the digital still camera.

Referring to FIG. 2, the signal processing IC 42 includes a CAM pre-block 51, a CAM DSP (digital signal processor) block 52, a JPEG block 53, and a memory card I/F (interface) 54. In FIG. 2, the parts corresponding to those in FIG. 1 are denoted by the same reference numerals, and the part that performs the same process as that in FIG. 1 is not described here.

In FIG. 2, rectangles defined by a solid line indicate blocks as elements of the apparatus, and rectangles defined by a broken line indicate predetermined data. The discrimination of a solid line and a broken line is also applied to other figures described below.

Upon press on a shutter switch caused by a user operation on the key switch 18, a capture command is input from the key switch 18 to the microcomputer 41. In accordance with the capture command from the key switch 18, the microcomputer 41 controls the signal processing IC 42 so that the signal processing IC 42 performs various processes on image data supplied from the camera block 11.

The CAM pre-block 51 performs camera preprocessing on the image data supplied from the camera block 11 and writes RAW data of the CCD 32 (hereinafter refereed to as CCD RAW data) 61R obtained through the preprocessing on the image memory 14 via the memory bus 13. Herein, the camera preprocessing includes correction of a pixel defect in the imaging device such as the CCD 32 and gain adjustment to adjust brightness.

Then, the CAM DSP block 52 reads the CCD RAW data 61R stored in the image memory 14 via the memory bus 13. The CAM DSP block 52 performs a DSP process on the CCD RAW data 61R and writes Y/Cb/Cr data (hereinafter referred to as Y/C data) 62R obtained through the DSP process on the image memory 14 via the memory bus 13. Herein, the DSP process includes interpolation of pixels, a filter process, and a matrix operation.

Then, the JPEG block 53 reads the Y/C data 62R stored in the image memory 14 via the memory bus 13. The JPEG block 53 performs JPEG compression on the Y/C data 62R and writes JPEG compressed data 63R obtained through the JPEG compression on the image memory 14 via the memory bus 13.

Then, the signal processing IC 42 reads the JPEG compressed data 63R and generates a file (hereinafter refereed to as an image compressed file) on the basis of the JPEG compressed data 63R. The memory card I/F 54 allows the generated image compressed file to be stored in the memory card 17 via the card bus 16 in accordance with the control by the signal processing IC 42.

In this way, during capturing of a still image, the digital still camera 1 performs a predetermined process on the image data supplied from the camera block 11 so as to sequentially generate data: the CCD RAW data 61R; the Y/C data 62R; and the JPEG compressed data 63R. Then, the digital still camera 1 generates the image compressed file on the basis of the JPEG compressed data 63R and stores the image compressed file in the memory card 17.

Next, the procedure of data processing during reproducing of a still image in the digital still camera 1 is described with reference to FIG. 3.

Figure 3:
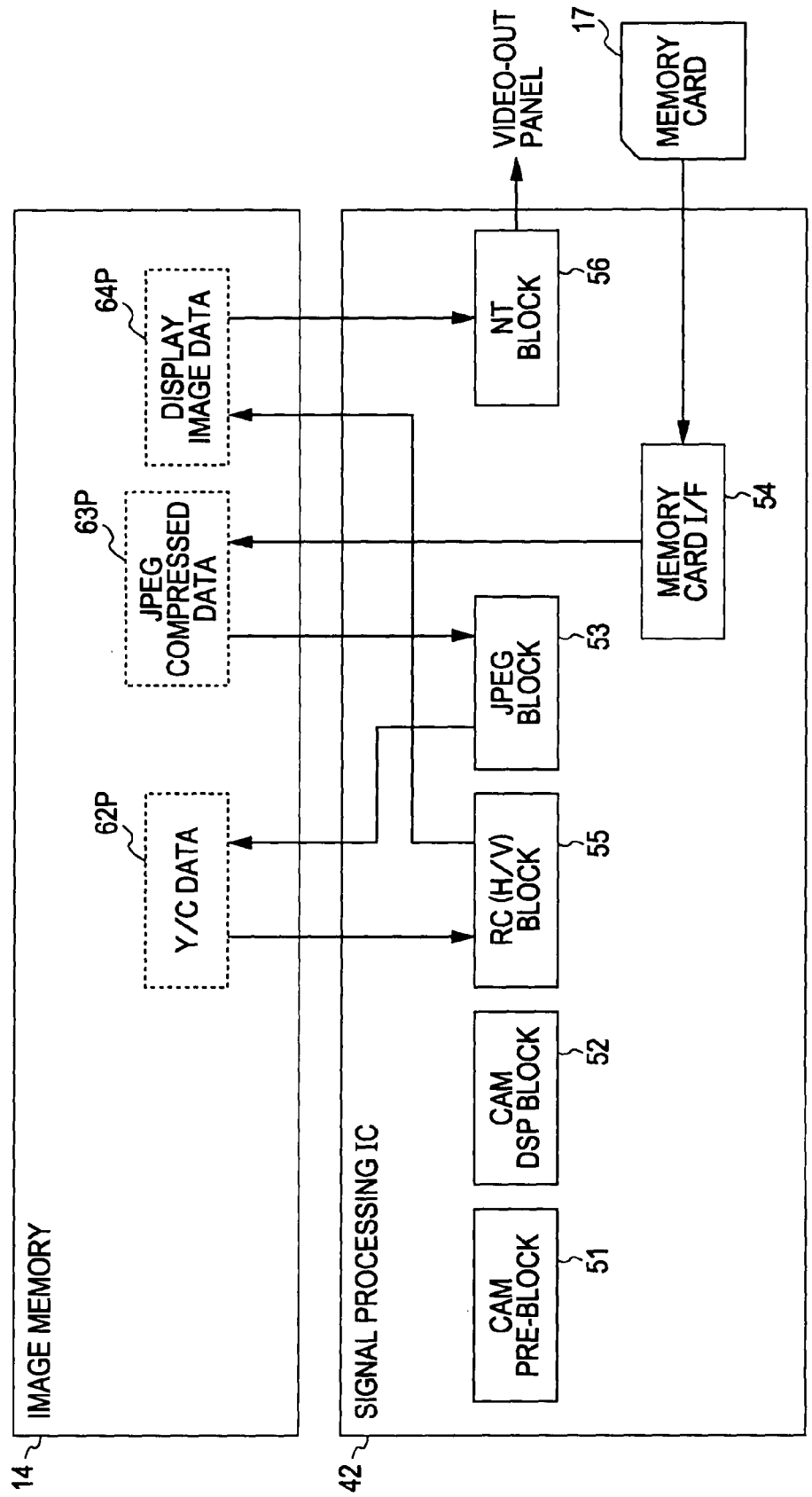
FIG. 3 illustrates a procedure of data processing during reproducing of a still image by the digital still camera.

Referring to FIG. 3, the signal processing IC 42 includes the CAM pre-block 51, the CAM DSP block 52, the JPEG block 53, the memory card I/F 54, an RC (H/V) block 55, and an NT block 56. In FIG. 3, the parts corresponding to those in FIGS. 1 and 2 are denoted by the same reference numerals, and the part that performs the same process as that in FIGS. 1 and 2 is not described here.

Upon press on a switch to provide instructions to reproduce the image compressed file stored in the memory card 17 caused by a user operation on the key switch 18, a reproducing command is input from the key switch 18 to the microcomputer 41. In accordance with the reproducing command from the key switch 18, the microcomputer 41 controls the signal processing IC 42 so that the signal processing IC 42 performs various processes on the image compressed file supplied from the memory card 17 via the card bus 16.

The memory card I/F 54 reads the image compressed file from the memory card 17 via the card bus 16 in accordance with the control by the microcomputer 41, and writes JPEG compressed data 63P included in the image compressed file on the image memory 14 via the memory bus 13.

Then, the JPEG block 53 reads the JPEG compressed data 63P from the image memory 14 via the memory bus 13. The JPEG block 53 performs JPEG decompression on the JPEG compressed data 63P and writes Y/C data 62P obtained through the JPEG decompression on the image memory 14 via the memory bus 13.

Then, the RC (H/V) block 55 reads the Y/C data 62P from the image memory 14 via the memory bus 13. The RC (H/V) block 55 reduces the image size of the Y/C data 62P in accordance with the display size of the liquid crystal panel 15, so as to generate data of a reduced image size (hereinafter referred as display image data) 64P. Then, the RC (H/V) block 55 writes the display image data 64P on the image memory 14 via the memory bus 13.

Then, the NT block 56 reads the display image data 64P from the image memory 14 via the memory bus 13 and outputs the display image data 64P to a video-out (e.g., an apparatus (not shown) including a composite input) or a panel (e.g., the liquid crystal panel 15).

In this way, during reproducing of a still image, the digital still camera 1 performs a predetermined process on the data in the image compressed file supplied from the memory card 17, so as to sequentially generate data: the JPEG compressed data 63P; the Y/C data 62P; and the display image data 64P. The display image data 64P is then output to the liquid crystal panel 15 and is displayed thereon.

Figure 4:
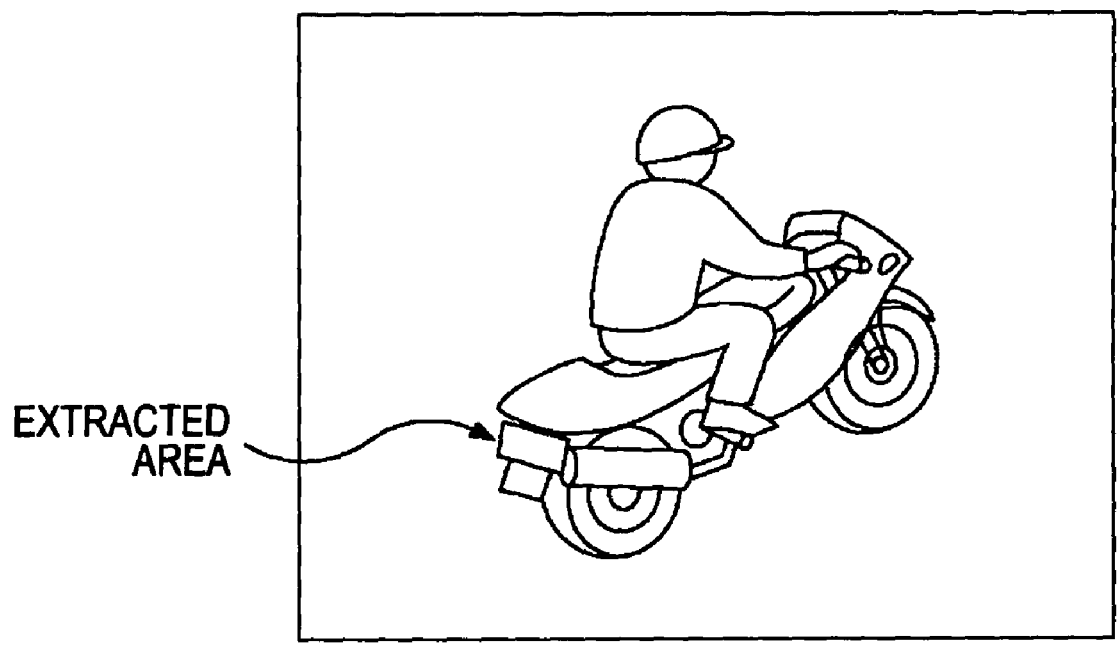
FIG. 4 shows an example of an image captured by the digital still camera.

For example, assume that the user captures the image shown in FIG. 4 by operating the digital still camera 1. In this case, the license plate number of the motorcycle (a number such as "12-34" is actually written on the license plate but the license plate is painted out as an extracted area in FIG. 4) can relate to the personal information of the user, and thus the user may want to make the character information on the license plate unreadable.

At this time, the digital still camera 1 can make the number "12-34" on the license plate shown in FIG. 4 unreadable by anyone in the method illustrated in FIG. 5. That is, the area including the number "12-34" may be painted out with a single color, an icon may be superimposed on the area including the number "12-34", or a mosaic pattern may be applied on the area including the number "12-34".

More specifically, at the data processing during capturing of a still image illustrated in FIG. 2, the digital still camera 1 can hide the number "12-34" on the license plate shown in FIG. 4 by performing a predetermined process on the Y/C data 62R written on the image memory 14. Also, at the data processing during reproducing of the still image illustrated in FIG. 3, the digital still camera 1 can restore the hidden number "12-34" on the license plate shown in FIG. 4 by performing a predetermined process on the Y/C data 62P written on the image memory 14.

Hereinafter, according to this embodiment, a process performed by the digital still camera 1 of hiding the number "12-34" on the license plate shown in FIG. 4 so that the number becomes unreadable by anyone, e.g., by painting out the number with a single color, is described with reference to FIGS. 6 to 12. Then, a process of restoring the hidden number "12-34" on the license plate so that the number can be read is described with reference to FIGS. 13 to 15.

Figure 6:
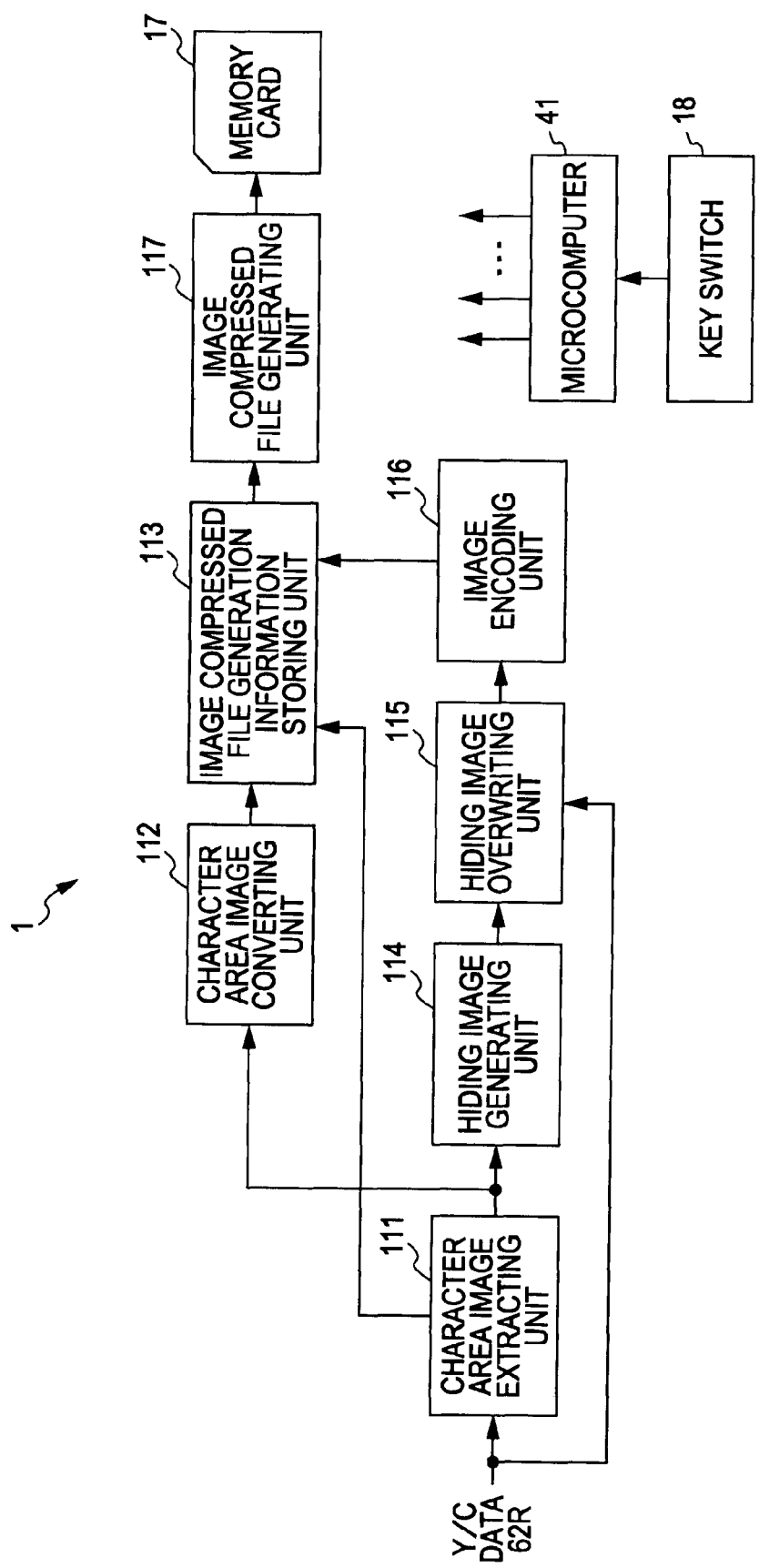
FIG. 6 is a block diagram showing an example of a functional configuration of the digital still camera.

FIG. 6 is a block diagram showing an example of a functional configuration of the digital still camera 1.

The digital still camera 1 includes a character area image extracting unit 111, a character area image converting unit 112, an image compressed file generation information storing unit 113, a hiding image generating unit 114, a hiding image overwriting unit 115, an image encoding unit 116, and an image compressed file generating unit 117.

The functional block diagram in FIG. 6 shows an example of the functional configuration of the signal processing IC 42 controlled by the microcomputer 41 on the basis of operation signals supplied from the key switch 18.

These functional blocks may be realized when the microcomputer 41 executes a predetermined program. That is, in this embodiment, the digital still camera 1 has the hardware configuration shown in FIG. 1, and thus the character area image extracting unit 111, the character area image converting unit 112, the hiding image generating unit 114, the image encoding unit 116, or the image compressed file generating unit 117 is executed by the microcomputer 41 that executes the software (computer program) stored in the program flash memory 22. The image compressed file generation information storing unit 113 corresponds to the image memory 14 shown in FIG. 1, for example.

However, the character area image extracting unit 111, the character area image converting unit 112, the hiding image generating unit 114, the image encoding unit 116, or the image compressed file generating unit 117 can be configured as hardware or a combination of software and hardware.

The character area image extracting unit 111 extracts, from the Y/C data 62R (hereinafter also referred to as main image data) that can be obtained by performing various processes by the signal processing IC 42 on the image data supplied from the camera block 11, image data of the area including character information as text information of characters or numerals in the main image data (hereinafter such image data is referred to as character area image data). The character area image extracting unit 111 supplies the extracted character area image data to the character area image converting unit 112 or the hiding image generating unit 114.

Also, the character area image extracting unit 111 detects information specifying the position of the character area image data in the main image data, such as an area ID, a character area starting point (X, Y), a character area horizontal size H, and a character area vertical size V (hereinafter the information is referred to as character area specifying information). Then, the character area image extracting unit 111 supplies the character area specifying information to the image compressed file generation information storing unit 113. The details of the character area specifying information are described below.

The image compressed file generation information storing unit 113 stores the character area specifying information supplied from the character area image extracting unit 111.

The character area image converting unit 112 converts the character area image data supplied from the character area image extracting unit 111 in accordance with a predetermined method, such as encrypting JPEG. Then, the character area image converting unit 112 supplies the converted character area image data to the image compressed file generation information storing unit 113 so that the converted data is stored therein.

The image compressed file generation information storing unit 113 stores the converted character area image data supplied from the character area image converting unit 112.

The hiding image generating unit 114 generates image data (hiding image data) with which the extracted character area image data supplied from the character area image extracting unit 111 is overwritten (replaced) on the basis of the extracted character area image data. The hiding image generating unit 114 supplies the generated hiding image data to the hiding image overwriting unit 115.

The hiding image overwriting unit 115 is supplied with the main image data (Y/C data 62R) and the hiding image data supplied from the hiding image generating unit 114. The hiding image overwriting unit 115 overwrites (or replaces) the character area image data extracted from the main image data with the hiding image data. Then, the hiding image overwriting unit 115 supplies the main image data in which the character area image data is overwritten with the hiding image data to the image encoding unit 116.

The image encoding unit 116 encodes the main image data supplied from the hiding image overwriting unit 115 in a predetermined method, such as JPEG compression. Then, the image encoding unit 116 supplies the main image data encoded with the predetermined encoding method to the image compressed file generation information storing unit 113 so that the encoded main image data is stored therein.

The image compressed file generation information storing unit 113 stores the main image data supplied from the image encoding unit 116. Accordingly, the image compressed file generation information storing unit 113 stores the data used to generate an image compressed file (hereinafter referred to as image compressed file generation information), such as the character area specifying information, the converted character area image data, and the main image data.

The image compressed file generating unit 117 reads the image compressed file generation information from the image compressed file generation information storing unit 113 and generates an image compressed file on the basis of the read image compressed file generation information. Then, the image compressed file generating unit 117 supplies the generated image compressed file to the memory card 17 so that the file is stored therein.

In the functional block diagram shown in FIG. 6, the JPEG compressed data 63R is generated by performing a predetermined process on the Y/C data 62R. Thus, the above-described main image data (the main image data that has not been encoded by the image encoding unit 116), the character area image data, and the hiding image data correspond to the Y/C data 62R, whereas the main image data (the main image data that has been encoded by the image encoding unit 116) and the converted character area image data correspond to the JPEG compressed data 63R.

Hereinafter, a capturing process performed by the digital still camera 1 is described with reference to the flowchart shown in FIG. 7.

In step S11, the camera block 11 captures an image by forming an image of a subject, performing photoelectric conversion on the image, and generating image data corresponding to the image. The camera block 11 supplies the generated image data to the control block 12. Specifically, the camera block 11 generates the image data of the motorcycle shown in FIG. 4 and supplies the image data to the control block 12.

In step S12, the CAM pre-block 51 performs camera pre-processing on the image data supplied from the camera block 11 in accordance with the control by the microcomputer 41. For example, the CAM pre-block 51 performs correction of a pixel defect in the CCD 32.

In step S13, the CAM pre-block 51 stores the CCD RAW data 61R, which is obtained by performing the camera pre-processing on the image data supplied from the camera block 11 in accordance with the control by the microcomputer 41, in the image memory 14 via the memory bus 13.

In step S14, the CAM DSP block 52 reads the CCD RAW data 61R, which is stored in the image memory 14 via the memory bus 13, in accordance with the control by the microcomputer 41, and performs the DSP process including interpolation of pixels on the CCD RAW data 61R.

In step S15, the CAM DSP block 52 stores the Y/C data 62R, which is obtained by performing the DSP process on the CCD RAW data 61R, in the image memory 14 via the memory bus 13.

In step S16, the character area image extracting unit 111, the character area image converting unit 112, the image compressed file generation information storing unit 113, the hiding image generating unit 114, the hiding image overwriting unit 115, the image encoding unit 116, and the image compressed file generating unit 117 perform a character encoding process to hide the character information included in the captured image, such as the image of the license plate number of the motorcycle shown in FIG. 4.

Now, the details of the character encoding process corresponding to step S16 performed by the digital still camera 1 are described with reference to the flowchart shown in FIG. 8.

In step S31, the character area image extracting unit 111 detects character information included in the image in the main image data (Y/C data 62R) stored in the image memory 14.

In order to detect the character information included in the image in the main image data, the method disclosed in Japanese Unexamined Patent Application Publication No. 2000-331146 can be used, for example. In this method, an image including character information is extracted from an input image, and character information of each character is detected. Alternatively, the method disclosed in Japanese Unexamined Patent Application Publication No. 5-35915 can be used. In this method, candidate positions where a character may be detected are extracted in accordance with a change in grayscale projected data of an image including character information, the position where a character can be detected is determined in accordance with a recognition result of a character pattern detected on the basis of the candidate positions, and character recognition is performed in units of characters. In this way, any method can be used as long as the character information included in the image can be extracted. In other words, the character area image extracting unit 111 detects character information from the image in the main image data by using any of the above-described methods.

Figure 9:
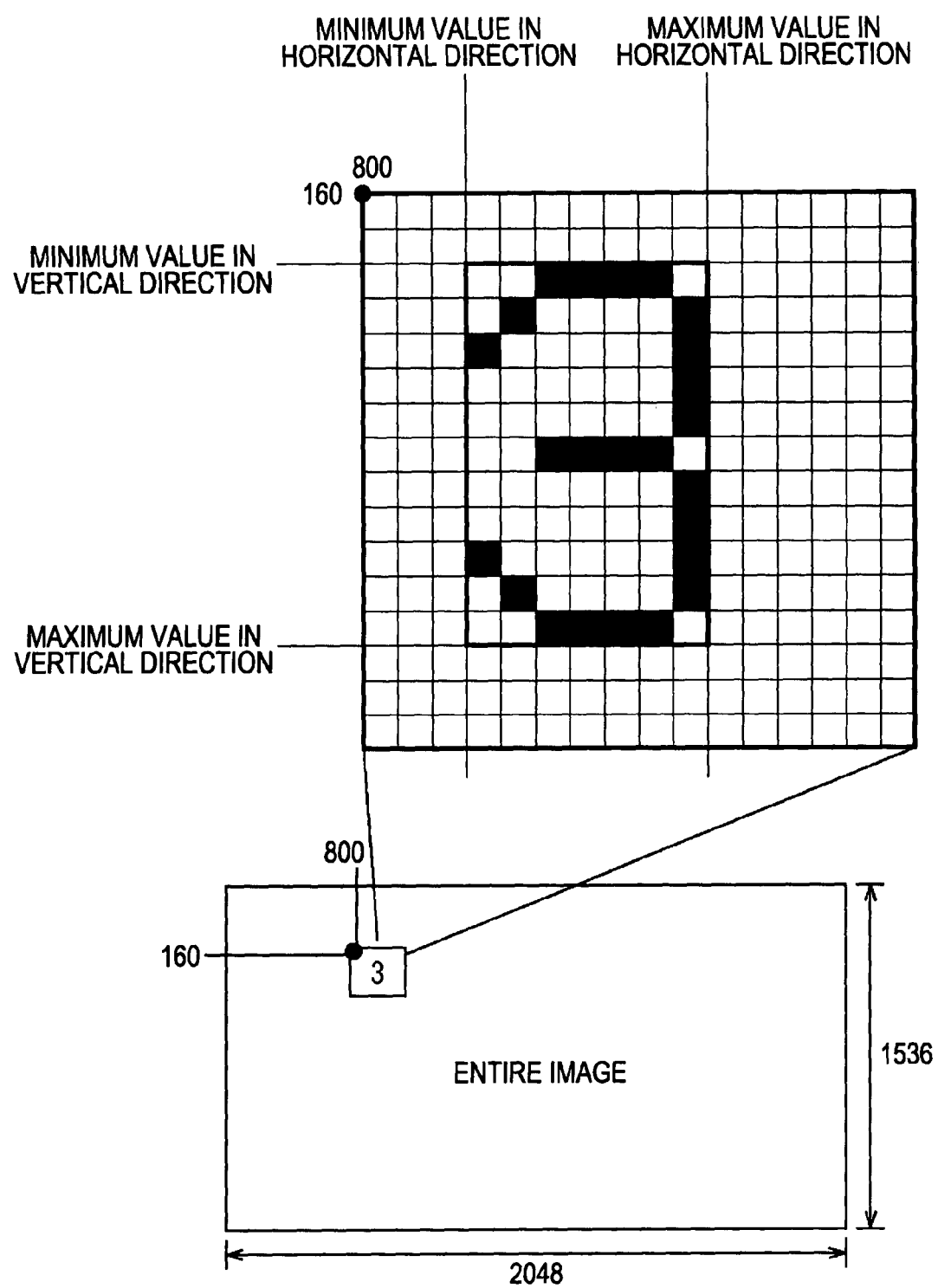
FIG. 9 illustrates extraction of a character area image.

In step S32, the character area image extracting unit 111 performs a character area image extracting process to extract an image in a predetermined area including the detected character information. More specifically, the character area image extracting unit 111 extracts a character area image including character information "3" from the entire image of 1536 pixels (vertical direction)×2048 pixels (horizontal direction) in the main image data, as shown in FIG. 9. In other words, the entire image shown in FIG. 9 is the same as the image of the motorcycle shown in FIG. 4. The character area image extracting unit 111 extracts the character area image including the character information "3" in the number "12-34" written on the license plate of the motorcycle shown in FIG. 4. Hereinafter, a process of extracting "3" in the number "12-34" is described as an example of a process of extracting the character area image "12-34" on the license plate, which is the extracted area shown in FIG. 4, for description simplicity.

Figure 10:
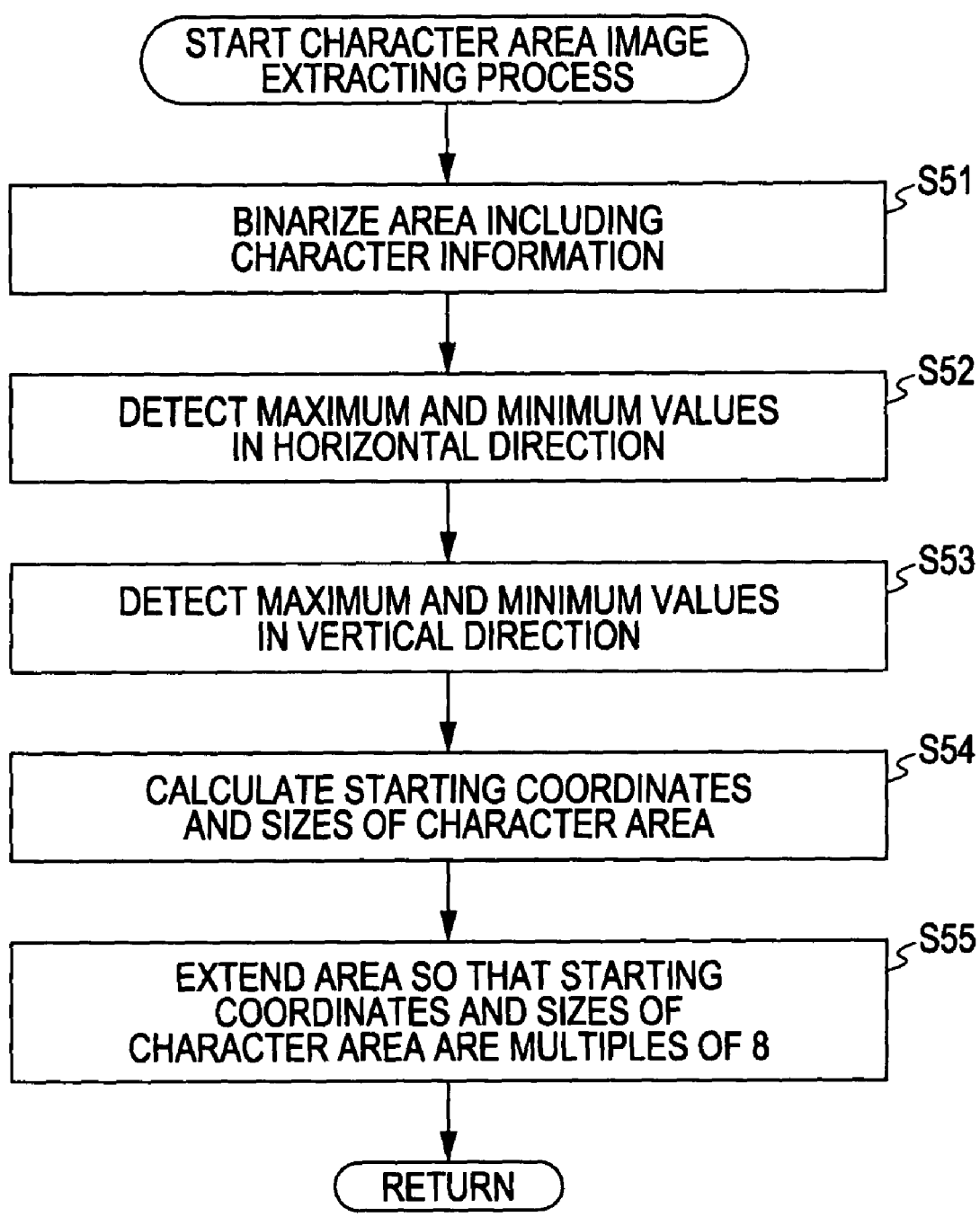
FIG. 10 is a flowchart illustrating the details of a character area image extracting process performed by a character area image extracting unit.

Now, the character area image extracting process corresponding to step S32 performed by the character area image extracting unit 111 is described in detail with reference to the flowchart shown in FIG. 10. In this case, assume that the character area image extracting unit 111 extracts the character area image including the character information "3" shown in FIG. 9.

In step S51, the character area image extracting unit 111 binarizes the area including the detected character information with a luminance signal on the basis of a predetermined threshold. The threshold is not limited to the predetermined value, but may be an average of luminance signals in the area including the detected character information.

More specifically, the character area image extracting unit 111 compares the luminance signals of the pixels constituting the character information with the predetermined threshold. For example, as shown in FIG. 9, in the character information "3" included in 11 pixels (vertical direction)×7 pixels (horizontal direction) defined by an inner bold line, the pixel corresponding to the luminance signal that exceeds the threshold is black, whereas the pixel corresponding to the luminance signal that is equal to or lower than the threshold is white.

In step S52, the character area image extracting unit 111 detects maximum and minimum values in the horizontal direction of the character information. More specifically, as shown in FIG. 9, the character area image extracting unit 111 detects a maximum value of 810 (pixel) and a minimum value of 803 (pixel) in the horizontal direction of the character information.

In step S53, the character area image extracting unit 111 detects maximum and minimum values in the vertical direction of the character information. More specifically, as shown in FIG. 9, the character area image extracting unit 111 detects a maximum value of 173 (pixel) and a minimum value of 162 (pixel) in the vertical direction of the character information.

In step S54, the character area image extracting unit 111 calculates the starting position and the size of the area by using the detected maximum and minimum values in the horizontal and vertical directions. More specifically, the character area image extracting unit 111 calculates the character starting point (X, Y), the character horizontal size H, and the character vertical size V by using the following expressions (1) to (3).

$$\text{Character starting point } (X, Y) = (\text{minimum value in the horizontal direction, minimum value in the vertical direction}) \quad (1)$$

$$\text{Character horizontal size } H = \text{maximum value in the horizontal direction} - \text{minimum value in the horizontal direction} \quad (2)$$

$$\text{Character vertical size } V = \text{maximum value in the vertical direction} - \text{minimum value in the vertical direction} \quad (3)$$

That is, by applying expressions (1) to (3), the character area image extracting unit 111 calculates the character starting point (X, Y)=(803, 162) in accordance with expression (1); the character horizontal size H=810−803=7 in accordance with expression (2); and the character vertical size V=173−162=11 in accordance with expression (3).

In step S55, the character area image extracting unit 111 extends the area so that the detected starting position and the sizes of the area are multiples of 8. More specifically, the character area image extracting unit 111 calculates the character area starting point (X, Y), the character area horizontal size H, and the character area vertical size V by using the following expressions (4) to (6).

$$\text{Character area starting point } (X, Y) = ([\text{character starting point } X/8] \times 8, [\text{character starting point } Y/8] \times 8) \quad (4)$$

$$\text{Character area horizontal size } H = ([\text{character horizontal size } H/8]+1) \times 8 \quad (5)$$

$$\text{Character area vertical size } V = ([\text{character vertical size } V/8]+1) \times 8 \quad (6)$$

In expressions (4) to (6), [] means that all digits to the right of the decimal point of the value are discarded so that only an integer part is remained. Note that the integer part is an integer of 1 or more.

That is, by applying expressions (4) to (6), the character area image extracting unit 111 calculates the character area starting point (X, Y)=([803/8]×8, [162/8]×8)=([100.375]×8, [20.25]×8)=(800, 160) in accordance with expression (4); the character area horizontal size H=([7/8]+1)×8=([0.875]+1)×8=16 in accordance with expression (5); and the character area vertical size V=([11/8]+1)×8=([1.375]+1)×8=16 in accordance with expression (6).

The reason why the starting position and the sizes of the area are multiples of 8 is as follows. That is, in the JPEG compression, an image is divided into blocks of a fixed size (8 pixels in the vertical direction×8 pixels in the horizontal direction), and transform from a space area to a frequency area is performed in units of blocks by using DCT (discrete cosine transform). Therefore, by extending the area to multiples of 8 in step S55, the processing unit of the character area image data can be matched with the processing unit of the JPEG compression. Accordingly, the digital still camera 1 can perform the JPEG compression (described below) without affecting the data in the area other than the character area image data.

The character area image extracting unit 111 supplies the character area image data that is defined by an outer bold line shown in FIG. 9 specified by the character area starting point (80, 160), the character area horizontal size H=16, and the character area vertical size V=16 and that includes the character information "3", that is, the character area image data of the license plate of the motorcycle shown in FIG. 4 (image data of the license plate "12-34"), to the character area image converting unit 112 and the hiding image generating unit 114.

Figure 8:
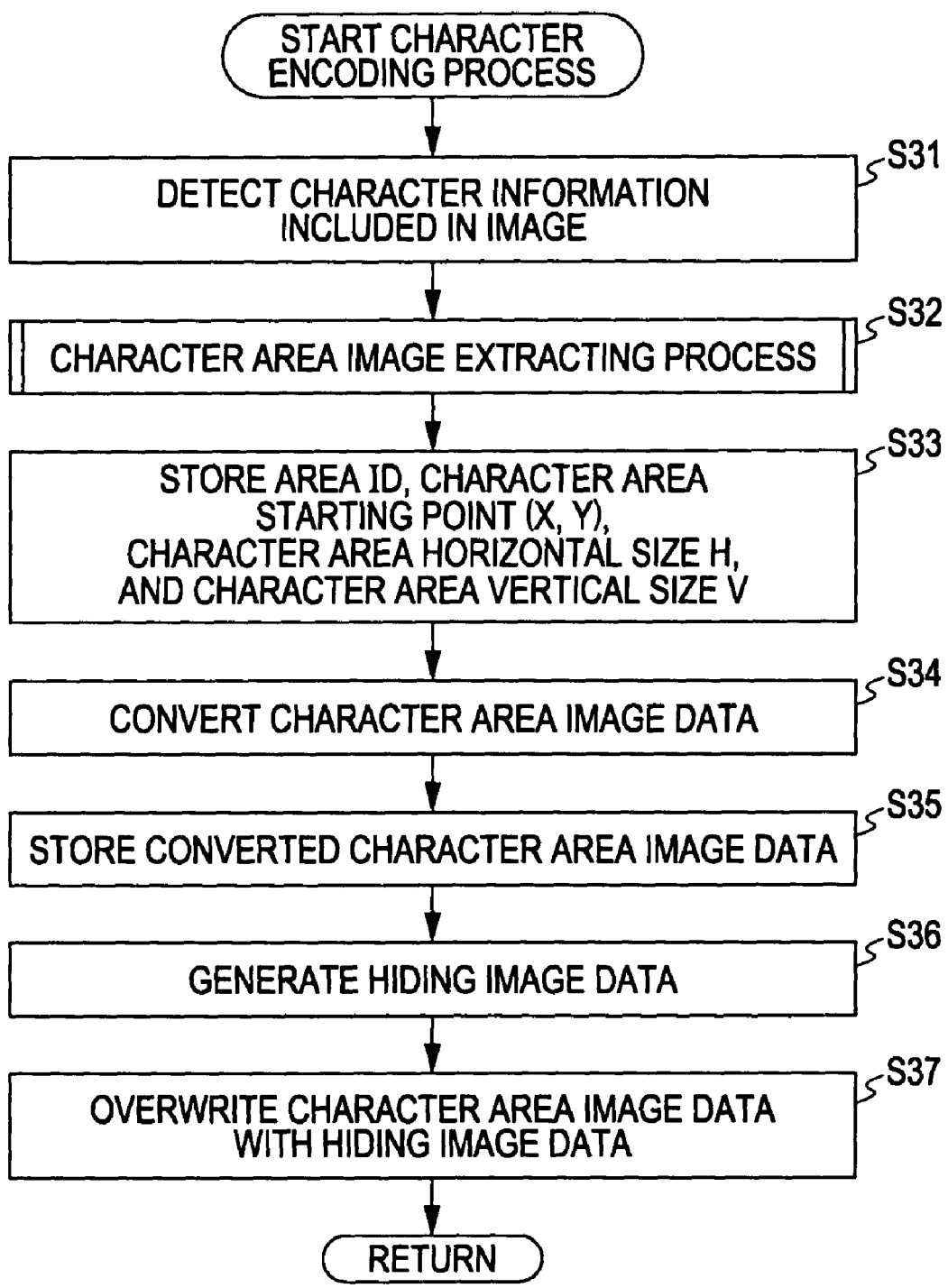
FIG. 8 is a flowchart illustrating the details of a character encoding process performed by the digital still camera.

Referring back to the flowchart shown in FIG. 8, in step S33, the character area image extracting unit 111 supplies character area specifying information, including an area ID indicating that the data is first character area image data, the character area starting point (X, Y), the character area horizontal size H, and the character area vertical size V, to the image compressed file generation information storing unit 113 so that the information is stored therein. The area ID is an ID to identify each piece of image data when a plurality of pieces of character area image data are extracted. The area ID is assigned to each piece of extracted character area image data by sequentially incrementing a counter.

Accordingly, the image compressed file generation information storing unit 113 stores the character area specifying information, that is, the area ID=1, the character area starting point (800, 160), the character area horizontal size H=16, and the character area vertical size V=16.

In step S34, the character area image converting unit 112 converts the character area image data supplied from the character area image extracting unit 111 in accordance with a predetermined method. Specifically, the character area image converting unit 112 converts the character area image data of the license plate of the motorcycle indicated by the extracted area shown in FIG. 4 by encrypting JPEG, for example. Alternatively, the character area image converting unit 112 may convert the character area image data to another format by performing JPEG compression or the like on the character area image data, instead of the encrypting JPEG.

In step S35, the character area image converting unit 112 supplies the converted character area image data to the image compressed file generation information storing unit 113 so that the converted data is stored therein.

Accordingly, the image compressed file generation information storing unit 113 stores the converted character area image data that has been obtained by performing encrypting JPEG on the image of the license plate shown in FIG. 4 (image of "12-34"), as well as the character area specifying information including the area ID=1, the character area starting point (800, 160), the character area horizontal size H=16, and the character area vertical size V=16.

In step S36, the hiding image generating unit 114 generates hiding image data on the basis of the character area image data supplied from the character area image extracting unit 111 and supplies the generated hiding image data to the hiding image overwriting unit 115. More specifically, the hiding image generating unit 114 generates, as the hiding image data, image data of a single color (e.g., white) as shown in FIG. 5 with which the image of the license plate of the motorcycle in the character area image data shown in FIG. 4 is to be overwritten, and supplies the white image data to the hiding image overwriting unit 115.

As described above with reference to FIG. 5, the hiding image data may be an icon or a mosaic pattern to hide the image of the license plate of the motorcycle in the character area image data shown in FIG. 4, other than the image data of a single color.

In step S37, the hiding image overwriting unit 115 overwrites the character area image data extracted from the main image data with the hiding image data on the basis of the main image data and the hiding image data supplied from the hiding image generating unit 114, and supplies the main image data obtained accordingly to the image encoding unit 116. Accordingly, the character encoding process by the digital still camera 1 shown in FIG. 6 ends.

More specifically, the hiding image overwriting unit 115 writes the value of the white image data converted to Y/Cb/Cr data (Y/C data) on the memory area corresponding to the character area image data (Y/C data 62R) of the image of the license plate of the motorcycle extracted from the main image data stored in the image memory 14. Accordingly, the license plate "12-34" is painted out with white as shown in FIG. 5.

When overwriting with the hiding image data in the main image data is unnecessary, for example, when the setting is made by a user operation so that a process of hiding character information is not performed or when no character area image data is extracted, the processes performed by the hiding image generating unit 114 and the hiding image overwriting unit 115 are skipped. That is, the hiding image overwriting unit 115 supplies the main image data in which overwriting with hiding image data is not performed to the image encoding unit 116.

Figure 7:
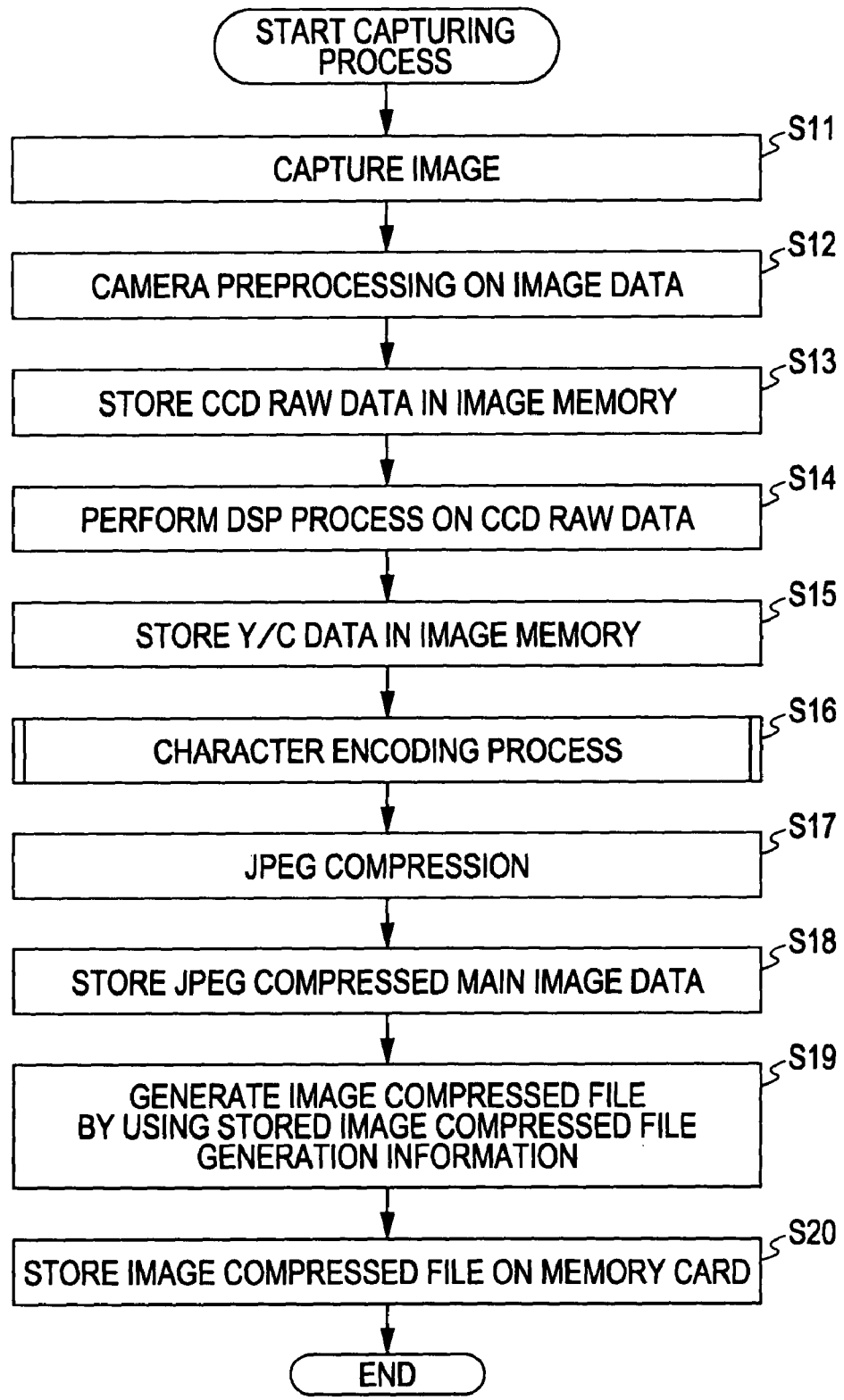
FIG. 7 is a flowchart illustrating a capturing process performed by the digital still camera.

Referring back to the flowchart shown in FIG. 7, in step S17, the image encoding unit 116 encodes the main image data (Y/C data 62R) supplied from the hiding image overwriting unit 115 in accordance with a predetermined method, such as the JPEG compression.

In step S18, the image encoding unit 116 supplies the main image data (JPEG compressed data 63R) to the image compressed file generation information storing unit 113 so that the main image data is stored therein.

Accordingly, the image compressed file generation information storing unit 113 stores the main image data in which the license plate "12-34" shown in FIG. 4 is painted out with white, as well as the character area specifying information including the area ID=1, the character area starting point (800, 160), the character area horizontal size H=16, and the character area vertical size V=16, and the converted character area image data of the license plate "12-34".

In step S19, the image compressed file generating unit 117 generates an image compressed file by using the image compressed file generation information that is stored in the image compressed file generation information storing unit 113 and that includes the character area specifying information, the converted character area image data, and the main image data.

Herein, the following two types can be adopted as a configuration of the image compressed file generated by the image compressed file generating unit 117. According to the configuration shown in FIG. 11A, a file header, main image data, and character area data are sequentially recorded in an image compressed file when data of an image is recorded. On the other hand, according to the configuration shown in FIG. 11B, a file header, character area data, and main image data are sequentially recorded.

Figure 11A:
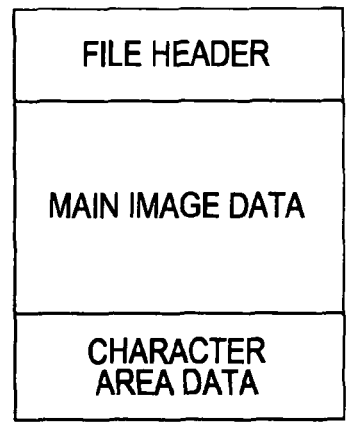
FIGS. 11A and 11B show examples of a configuration of an image compressed file.

More specifically, in FIG. 11A, the file header includes a format, the date of recording, and parameters of the character area data. The parameters include the start address of the character area data and the type of the character area data (e.g., compressed or uncompressed, and the image size).

The main image data is the image data that is encoded by the image encoding unit 116 and that is stored in the image compressed file generation information storing unit 113. For example, the main image data is the image data of the motorcycle shown in FIG. 4 in which the license plate "12-34" is painted out with white.

Figure 12:
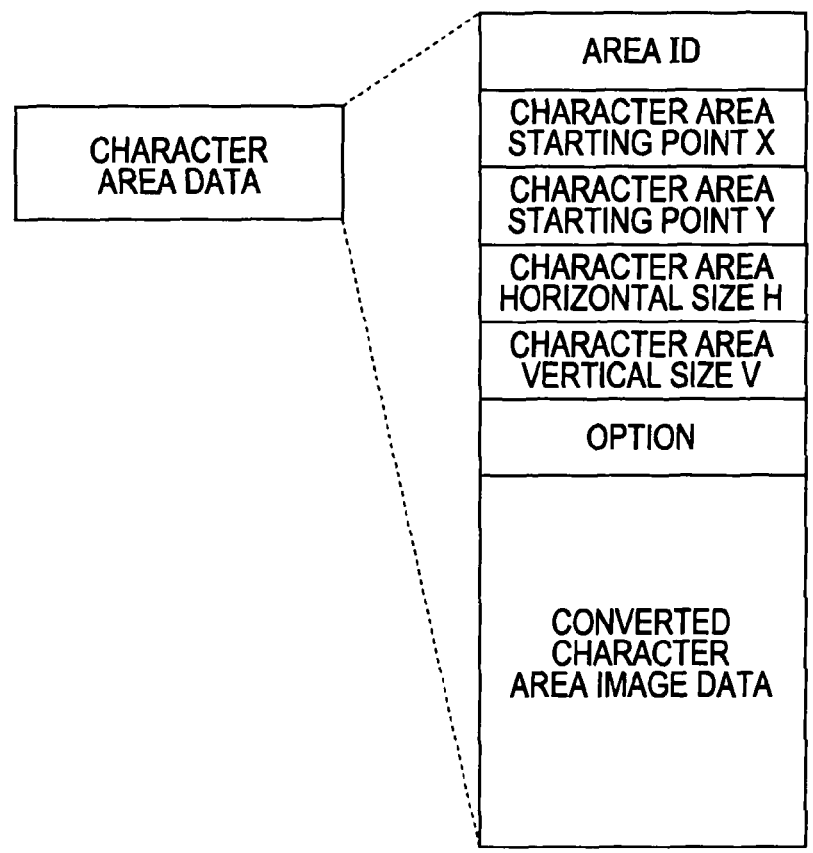
FIG. 12 shows an example of a configuration of character area data.

As shown in FIG. 12, the character area data includes an area ID, a character area starting point X, a character area starting point Y, a character area horizontal size H, a character area vertical size V, an option, and converted character area image data, which are sequentially recorded. For example, the character area specifying information including the area ID=1, the character area starting point X=800, the character area starting point Y=160, the character area horizontal size H=16, and the character area vertical size V=16; and the converted character area image data obtained by performing the encrypting JPEG on the image of the license plate "12-34" shown in FIG. 4 specified by the character area specifying information, are sequentially recorded. The option is an area provided for expansion and stores information indicating whether the character area image data is to be displayed and information indicating the type of the hiding image data.

Although not shown, if two or more pieces of character area image data are extracted, character area data is added in accordance with the number of pieces of extracted data. For example, if three pieces of character area image data are extracted and if the file configuration shown in FIG. 11A is applied, a file header, main image data, first character area data, second character area data, and third character area data are sequentially recorded. At this time, the area IDs stored in the character area data are as follows: the area ID=1 in the first character area data, the area ID=2 in the second character area data, and the area ID=3 in the third character area data.

Figure 11B:
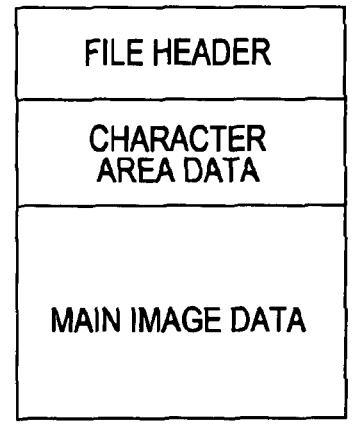

In FIG. 11B, as in FIG. 11A, the file header includes a format and so on, the character area data includes the area ID as shown in FIG. 12, and the main image data includes the main image data in which overwriting with hiding image data has been performed, the main image data being JPEG compressed.

That is, the image compressed file generating unit 117 generates an image compressed file having the file configuration shown in FIG. 11A or 11B on the basis of the image compressed file generation information including the character area specifying information, the converted character area image data, and the main image data stored in the image compressed file generation information storing unit 113.

Referring back to the flowchart shown in FIG. 7, in step S20, the image compressed file generating unit 117 writes the generated image compressed file on the memory card 17, so that the capturing process by the digital still camera 1 ends.

As described above, during capturing of a still image, the digital still camera 1 overwrites the part of the number "12-34" on the license plate in the image data of the motorcycle shown in FIG. 4 with the image data of a single color, so as to generate an image compressed file including at least image data in which the number is hidden and image data to restore the hidden part, and stores the image compressed file.

Accordingly, when reproducing the image of the motorcycle shown in FIG. 4, the digital still camera 1 can hide the part of the number "12-34" on the license plate by performing the process of hiding the part of the number.

Hereinafter, a process of reproducing the image compressed file that is stored in the memory card 17 by the capturing process described above with reference to the flowchart shown in FIG. 7 performed by the digital still camera 1 shown in FIG. 6 is described with reference to FIGS. 13 to 15.

Figure 13:
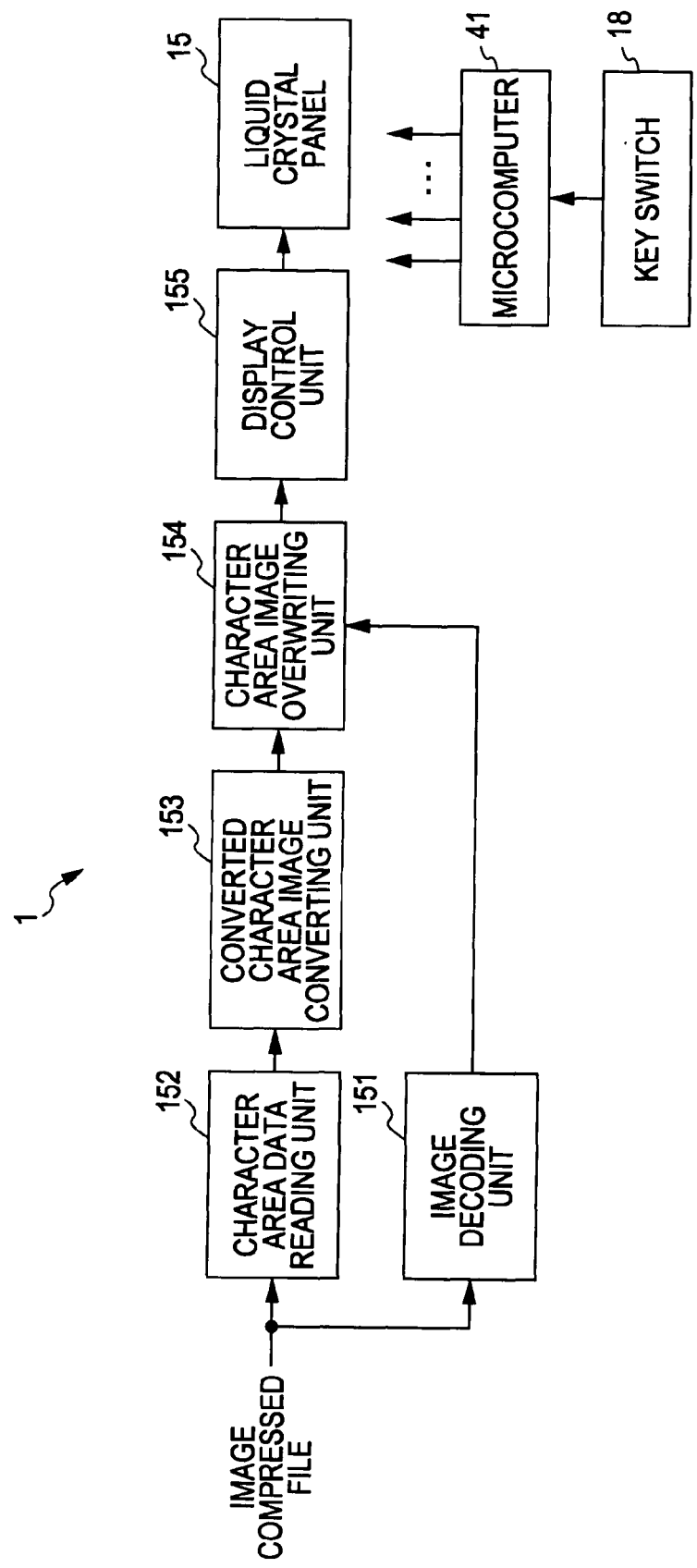
FIG. 13 is a block diagram showing an example of a functional configuration of the digital still camera.

FIG. 13 is a block diagram showing an example of a functional configuration of the digital still camera 1.

The digital still camera 1 includes an image decoding unit 151, a character area data reading unit 152, a converted character area image converting unit 153, a character area image overwriting unit 154, and a display control unit 155.

As in FIG. 6, the functional block diagram shown in FIG. 13 shows an example of the functional configuration of the signal processing IC 42 controlled by the microcomputer 41 based on operation signals supplied from the key switch 18.

These functional blocks may be realized when the microcomputer 41 executes a predetermined program. That is, in this embodiment, since the digital still camera 1 has the hardware configuration shown in FIG. 1, the character area data reading unit 152, the converted character area image converting unit 153, the character area image overwriting unit 154, or the display control unit 155 is executed by the microcomputer 41 executing the software (computer program) stored in the program flash memory 22.

However, the character area data reading unit 152, the converted character area image converting unit 153, the character area image overwriting unit 154, and the display control unit 155 can be configured as hardware or a combination of hardware and software.

The image decoding unit 151 performs JPEG decompression on the main image data (JPEG compressed data 63P) in the image compressed file. Then, the image decoding unit 151 supplies the main image data (Y/C data 62P) obtained by performing the JPEG decompression on the main image data to the character area image overwriting unit 154.

The character area data reading unit 152 reads the character area data from the image compressed file. Then, the character area data reading unit 152 supplies the read character area data to the converted character area image converting unit 153.

The converted character area image converting unit 153 is supplied with the character area data from the character area data reading unit 152. The converted character area image converting unit 153 converts the converted character area image data in accordance with the method with which the character area image data of the character area data is converted, such as the encrypting JPEG. Then, the converted character area image converting unit 153 supplies the character area image data (Y/C data 62P) that has been restored to the original state through the conversion to the character area image overwriting unit 154.

More specifically, the converted character area image converting unit 153 also supplies the character area specifying information, including the area ID, the character area starting point X, the character area starting point Y, the character area horizontal size H, and the character area vertical size V, in the character area data supplied from the character area data reading unit 152 to the character area image overwriting unit 154.

The character area image overwriting unit 154 is supplied with the main image data (Y/C data 62P) from the image decoding unit 151 and the character area image data (Y/C data 62P) and the character area specifying information from the converted character area image converting unit 153. The character area image overwriting unit 154 overwrites the predetermined area of the main image data specified by the character area specifying information, including the area ID, the character area starting point (X, Y), the character area horizontal size H, and the character area vertical size V, with the character area image data. Then, the character area image overwriting unit 154 supplies the main image data in which overwriting with the character area image data has been performed to the display control unit 155.

The display control unit 155 controls display of the main image data (Y/C data 62P), in which overwriting with the character area image data has been performed, supplied from the character area image overwriting unit 154 on the liquid crystal panel 15.

Hereinafter, a reproducing process performed by the digital still camera 1 is described with reference to the flowchart shown in FIG. 14.

In step S71, the memory card I/F 54 reads the image compressed file stored in the memory card 17 via the card bus 16 in accordance with the control by the microcomputer 41.

In step S72, the memory card I/F 54 stores the JPEG compressed data 63P in the image compressed file read from the memory card 17 in the image memory 14 via the memory bus 13 in accordance with the control by the microcomputer 41.

In step S73, the image decoding unit 151 reads the JPEG compressed data 63P from the image memory 14 via the memory bus 13 and performs JPEG decompression on the JPEG compressed data 63P in accordance with the control by the microcomputer 41.

In step S74, the image decoding unit 151 stores the Y/C data 62P obtained by performing the JPEG decompression on the JPEG compressed data 63P in the image memory 14 via the memory bus 13.

In other words, the image decoding unit 151 performs the JPEG decompression on the main image data (JPEG compressed data 63P) in the image compressed file so as to obtain the Y/C data 62P, and stores the Y/C data 62P in the image memory 14 via the memory bus 13. That is, at this time, the converted character area image data of the character area data in the image compressed file has not been decoded.

In step S75, the character area data reading unit 152, the converted character area image converting unit 153, and the character area image overwriting unit 154 perform a character decoding process in order to restore the hidden character information.

Now, the details of the character decoding process, corresponding to step S75, performed by the digital still camera 1 are described with reference to the flowchart shown in FIG. 15.

In step S91, the character area data reading unit 152 determines whether the hidden character information is to be displayed in accordance with the control by the microcomputer 41.

If the setting made by a user operation does not allow the hidden character information to be displayed and thus it is determined in step S91 that the hidden character information is not to be displayed, the character decoding process is not performed. Thus, steps S92 to S96 are skipped and the process returns to the flowchart shown in FIG. 14, and the subsequent steps are performed.

On the other hand, if the setting made by the user operation allows the hidden character information to be displayed and thus it is determined in step S91 that the hidden character information is to be displayed, the process proceeds to step S92, where the character area data reading unit 152 determines whether character area data is stored in the image compressed file that is stored in the memory card 17.

If it is determined in step 92 that the character area data is not stored in the image compressed file, no character information is detected from the main image data in the image compressed file and thus character decoding is not performed. Thus, steps S93 to S96 are skipped, the process returns to the flowchart shown in FIG. 14, and the subsequent steps are performed.

On the other hand, if it is determined in step S92 that the character area data is stored in the image compressed file, the process proceeds to step S93, where the character area data reading unit 152 reads the character area data from the image compressed file and supplies the character area data to the converted character area image converting unit 153.

In step S94, the converted character area image converting unit 153 converts the converted character area image data in the character area data supplied from the character area data reading unit 152 in accordance with a predetermined method, and supplies the character area image data restored to the original state to the character area image overwriting unit 154.

More specifically, the converted character area image converting unit 153 performs decoding on the converted character area image data read from the image compressed file by the character area data reading unit 152, that is, on the converted character area image data obtained by performing the encrypting JPEG (step S34 in FIG. 8) on the image of the license plate "12-34" shown in FIG. 4. Then, the converted character area image converting unit 153 supplies the character area image data of the license plate "12-34" that has been decoded and restored to the original state to the character area image overwriting unit 154.

In step S95, the character area image overwriting unit 154 overwrites the predetermined area of the main image data specified by the character area specifying information of the character area data stored in the image compressed file, the character area specifying information including the area ID, the character area starting point (X, Y), the character area horizontal size H, and the character area vertical size V, with the character area image data that has been converted and restored to the original state.

More specifically, when the area ID=1, the character area starting point X=800, the character area starting point Y=160, the character area horizontal size H=16, and the character area vertical size V=16 are stored as the character area specifying information in the image compressed file, the character area image overwriting unit 154 overwrites the area (the extracted area shown in FIG. 4) of the hiding image data in which the license plate "12-34" is painted out with white in the image data of the motorcycle shown in FIG. 4, the area being specified by the character area specifying information, with the character area image data of the license plate "12-34" shown in FIG. 4. Note that the main image data and the character area image data correspond to the Y/C data 62P.

In step S96, the character area image overwriting unit 154 stores the main image data (Y/C data 62P) obtained by overwriting the predetermined area of the main image data with the character area image data in the image memory 14 via the memory bus 13. Accordingly, the character decoding process shown in FIG. 15 performed by the digital still camera 1 shown in FIG. 13 ends.

If two or more pieces of character area image data are extracted, steps S93 to S95 are repeated, so that the corresponding number of pieces of converted character area image data are converted and that overwriting with the converted data is performed in the main image data. For example, if three pieces of character area image data are extracted and if the file configuration shown in FIG. 11A is adopted, a file header, main image data, first character area data, second character area data, and third character area data are sequentially recorded. In this case, the area IDs stored in the character area data are as follows: the area ID=1 in the first character area data, the area ID=2 in the second character area data, and the area ID=3 in the third character area data.

More specifically, in step S93, the character area data reading unit 152 reads the three pieces of character area data in the order of the area ID=1, the area ID=2, and the area ID=3. In step S94, the converted character area image converting unit 153 converts the pieces of converted character area image data of the character area data in the read order. In step S95, the character area image overwriting unit 154 sequentially overwrites the predetermined areas of the main image data specified by the character area specifying information corresponding to the area IDs with the pieces of character area image data corresponding to the area IDs obtained through the conversion.

Accordingly, even if the image includes a plurality of pieces of character information, the digital still camera 1 can hide and restore the character information.

Figure 14:
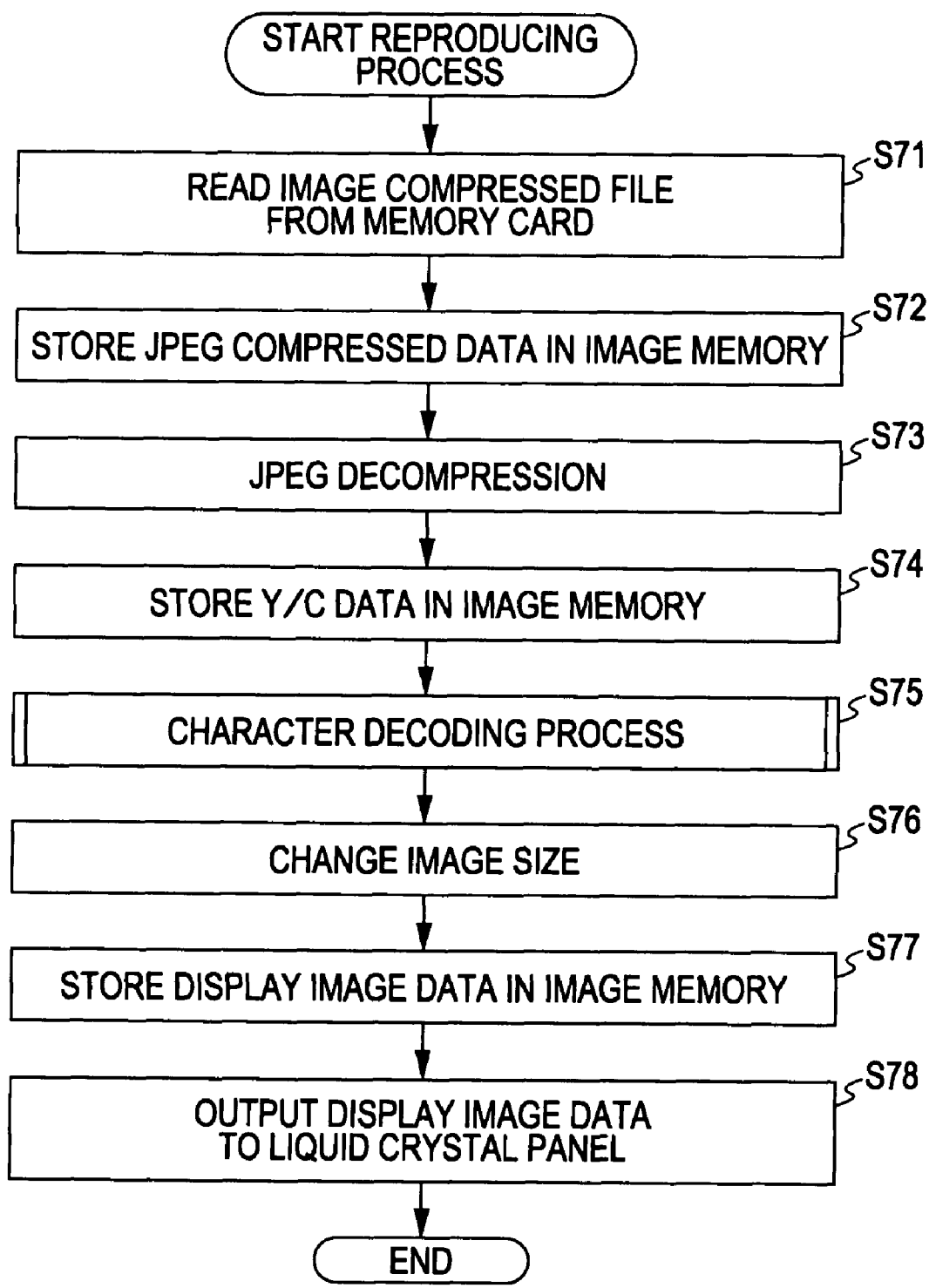
FIG. 14 is a flowchart illustrating a reproducing process performed by the digital still camera.

Referring back to the flowchart shown in FIG. 14, in step S76, the display control unit 155 reads the Y/C data 62P from the image memory 14 via the memory bus 13 and changes the image size of the Y/C data 62P in accordance with the size of the display of the liquid crystal panel 15.

In step S77, the display control unit 155 stores the display image data 64P, which is the Y/C data 62P of which image size has been changed in accordance with the size of the display of the liquid crystal panel 15, in the image memory 14 via the memory bus 13.

In step S78, the display control unit 155 reads the display image data 64P from the image memory 14 via the memory bus 13 and outputs the display image data 64P to the liquid crystal panel 15. Accordingly, the reproducing process performed by the digital still camera 1 ends.

With the above-described process, in the digital still camera 1, the liquid crystal panel 15 displays an image where the number "12-34" of the license plate is displayed in an area painted out with white, that is, in the extracted area in the image of the motorcycle shown in FIG. 4.

Figure 15:
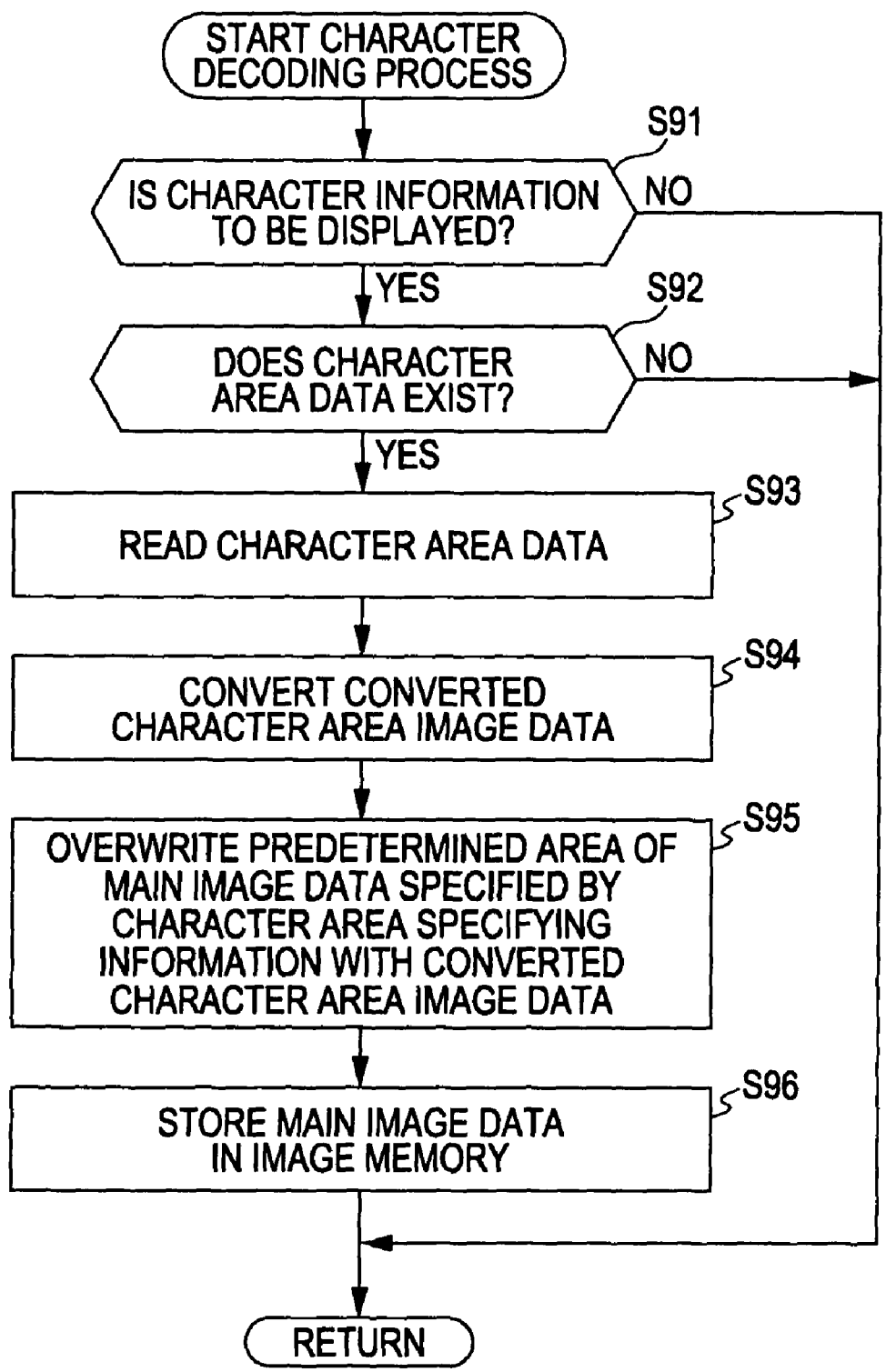
FIG. 15 is a flowchart illustrating the details of a character decoding process performed by the digital still camera.

When the setting made by a user operation does not allow the hidden character information to be restored so that the character information is not seen by anyone, steps S92 to S96 in the character decoding process shown in FIG. 15 are skipped. In that case, the converted character area image data is not restored and the main image data on which the predetermined process has been performed is displayed on the liquid crystal panel 15 in the digital still camera 1.

That is, in the digital still camera 1, the liquid crystal panel 15 displays an image in which the license plate number "12-34" shown in FIG. 4 is unrecognizable. For example, as shown in FIG. 5, the part of the number "12-34" is painted out with a single color, an icon is superimposed on the part of the number "12-34", or a mosaic pattern is applied on the part of the number "12-34" in the white extracted area in the image of the motorcycle shown in FIG. 4.

Accordingly, when the user allows someone to browse the image captured by the digital still camera 1 by using the Internet or the like and when the character information in the image includes personal information, the character information can be hidden so as not to be read.

As described above, during reproducing of a still image, the digital still camera 1 displays the image of the motorcycle in which the image of the license plate number "12-34" is restored by using the image data to restore the hidden part, which is the part of the number "12-34" on the license plate painted out with white in the image data of the motorcycle shown in FIG. 4.

The digital still camera 1 is used as an example in the above-described embodiment. However, the present invention is not limited to the digital still camera 1, but another apparatus having a function of performing the predetermined process on image data can be used, for example, a digital video camera, a personal computer, a mobile phone, a PDA (personal digital assistance), and a PHS (personal handyphone system).

The digital still camera 1 performs the process of hiding character information during capture of a still image in the above-described embodiment. Alternatively, the digital still camera 1 may perform the process of hiding character information during reproducing of the still image. That is, the digital still camera 1 performs the process of hiding character information by performing step S16 shown in FIG. 7 (character encoding process) instead of step S75 shown in FIG. 14 (character decoding process). Note that step S32 shown in FIG. 8 (character area image extracting process) may be performed during capturing or reproducing.

The method for hiding the character area image can be selected by a user operation on a menu screen from among painting out the character area image with a single color, superimposing an icon on the character area image, and applying a mosaic pattern on the character area image.

The digital still camera 1 can extract and hide only a character area image including the character information specified by a user operation. Also, the digital still camera 1 can display the extracted character area image on the liquid crystal panel 15 and hide only a part selected by a user operation from the displayed character area image.

The above-described series of processes can be executed by hardware or software. When the series of processes are executed by software, the program constituting the software is installed via a program recording medium into a computer incorporated in dedicated hardware or a multi-purpose personal computer capable of performing various functions by being installed with various programs.

FIG. 16 is a block diagram showing an example of a configuration of a personal computer performing the above-described series of processes in accordance with a program. A CPU (central processing unit) 211 executes various processes in accordance with a program recorded on a ROM (read only memory) 212 or a recording unit 218. The program executed by the CPU 211 and data are appropriately stored in a RAM (random access memory) 213. The CPU 211, the ROM 212, and the RAM 213 are mutually connected via a bus 214.

Also, an input/output interface 215 connects to the CPU 211 via the bus 214. An input unit 216 including a microphone and an output unit 217 including a display and a speaker connect to the input/output interface 215. The CPU 211 executes various processes in response to commands input from the input unit 216. Then, the CPU 211 outputs a result of the processes to the output unit 217.

The recording unit 218 connected to the input/output interface 215 includes a hard disk or the like, on which the program executed by the CPU 211 and various data are recorded. A communication unit 219 communicates with an external apparatus via a network, such as the Internet or a LAN (local area network).

The program may be obtained via the communication unit 219 and may be recorded on the recording unit 218.

A drive 220 connected to the input/output interface 215 drives a removable medium 221, such as a magnetic disk, an optical disc, a magneto-optical disc, or a semiconductor memory, when it is loaded thereto, and obtains the program or data recorded on the medium. The obtained program or data is transferred to the recording unit 218 and is recorded thereon as necessary.

The program recording medium to store the program that is installed in the computer and that is made executable by the computer includes the removable medium 221, which is a package medium including a magnetic disk (including a flexible disk), an optical disc (including a CD-ROM (compact disc read only memory) and a DVD (digital versatile disc)), a magneto-optical disc, and a semiconductor memory; the ROM 212 temporarily or permanently storing the program, and the hard disk serving as the recording unit 218. Storage of the program in the program recording medium is performed via the communication unit 219, which is an interface such as a router or a modem, by using a wired or wireless communication medium such as a LAN, the internet, or digital satellite broadcast.

In this specification, the steps describing the program stored in the recording medium may be performed in time series in accordance with the described order. Alternatively, the steps may be performed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus to capture an image of a subject, the image capturing apparatus comprising:
   extracting means for extracting a character area image of an area including a character from a captured subject image;
   converting means for converting the character area image in accordance with a first predetermined method;
   first generating means for generating a hiding image to make the character area image unrecognizable to a user;
   encoding means for encoding the subject image in which the character area image is overwritten with the generated hiding image in accordance with a second predetermined method; and
   second generating means for generating a file including area information specifying the area, converted character area image information obtained through the conversion, and subject image information obtained through the encoding.

2. The image capturing apparatus according to claim 1, wherein the hiding image is an image of a predetermined single color, a predetermined icon, or an image made by applying a mosaic pattern on the character area image.

3. The image capturing apparatus according to claim 1, wherein the area information includes information indicating a starting point, information indicating sizes in horizontal and vertical directions from the starting point, and an ID identifying the area in the subject image.

4. The image capturing apparatus according to claim 1, wherein the file includes at least header information, the subject image information, and one or a plurality of pieces of the area information and the converted character area image information.

5. The image capturing apparatus according to claim 1, wherein the first method is an encrypting JPEG method, and
wherein the converting means performs encryption in accordance with the encrypting JPEG method.

6. The image capturing apparatus according to claim 1, wherein the second method is a JPEG method, and
wherein the encoding means performs compression in accordance with the JPEG method.

7. An image capturing method for an image capturing apparatus to capture an image of a subject, the image capturing method comprising the steps of:
   extracting a character area image of an area including a character from a captured subject image;
   converting the character area image in accordance with a first predetermined method;
   generating a hiding image to make the character area image unrecognizable to a user;
   encoding the subject image in which the character area image is overwritten with the generated hiding image in accordance with a second predetermined method; and
   generating a file including area information specifying the area, converted character area image information obtained through the conversion, and subject image information obtained through the encoding.

8. A non-transitory computer readable medium including a program allowing a computer to execute an image capturing process of an image capturing apparatus to capture an image of a subject, the program comprising the steps of:
   extracting a character area image of an area including a character from a captured subject image;
   converting the character area image in accordance with a first predetermined method;
   generating a hiding image to make the character area image unrecognizable to a user;
   encoding the subject image in which the character area image is overwritten with the generated hiding image in accordance with a second predetermined method; and
   generating a file including area information specifying the area, converted character area image information obtained through the conversion, and subject image information obtained through the encoding.

9. An image processing apparatus to reproduce a captured subject image on the basis of a file including area information specifying an area including a character extracted from the captured subject image, converted character area image information obtained by converting a character area image in the area, and subject image information obtained by encoding the subject image, the image processing apparatus comprising:
　decoding means for decoding the subject image information in accordance with a first predetermined method;
　reading means for reading the area information and the converted character area image information from the file;
　converting means for converting the read converted character area image information in accordance with a second predetermined method;
　overwriting means for overwriting the area in the subject image obtained by the decoding with the character area image that has been restored to an original state by converting the converted character area image information in accordance with the read area information; and
　display control means for controlling display of the subject image in which overwriting with the character area image has been performed on a screen.

10. The image processing apparatus according to claim 9, wherein the area information includes information indicating a starting point, information indicating sizes in horizontal and vertical directions from the starting point, and an ID identifying the area in the subject image.

11. The image processing apparatus according to claim 9, wherein the first method is a JPEG method, and
wherein the decoding means performs decompression in accordance with the JPEG method.

12. The image processing apparatus according to claim 9, wherein the second method is an encrypting JPEG method, and
wherein the converting means performs decoding in accordance with the encrypting JPEG method.

13. An image processing method for an image processing apparatus to reproduce a captured subject image on the basis of a file including area information specifying an area including a character extracted from the captured subject image, converted character area image information obtained by converting a character area image in the area, and subject image information obtained by encoding the subject image, the image processing method comprising the steps of:
　decoding the subject image information in accordance with a first predetermined method;
　reading the area information and the converted character area image information from the file;
　converting the read converted character area image information in accordance with a second predetermined method;
　overwriting the area in the subject image obtained by the decoding with the character area image that has been restored to an original state by converting the converted character area image information in accordance with the read area information; and
　controlling display of the subject image in which overwriting with the character area image has been performed on a screen.

14. A non-transitory computer readable medium including a program allowing a computer to execute image processing of an image processing apparatus to reproduce a captured subject image on the basis of a file including area information specifying an area including a character extracted from the captured subject image, converted character area image information obtained by converting a character area image in the area, and subject image information obtained by encoding the subject image, the program comprising the steps of:
　decoding the subject image information in accordance with a first predetermined method;
　reading the area information and the converted character area image information from the file;
　converting the read converted character area image information in accordance with a second predetermined method;
　overwriting the area in the subject image obtained by the decoding with the character area image that has been restored to an original state by converting the converted character area image information in accordance with the read area information; and
　controlling display of the subject image in which overwriting with the character area image has been performed on a screen.

15. An image capturing apparatus to capture an image of a subject, the image capturing apparatus comprising:
　an extracting unit configured to extract a character area image of an area including a character from a captured subject image;
　a converting unit configured to convert the character area image in accordance with a first predetermined method;
　a first generating unit configured to generate a hiding image to make the character area image unrecognizable to a user;
　an encoding unit configured to encode the subject image in which the character area image is overwritten with the generated hiding image in accordance with a second predetermined method; and
　a second generating unit configured to generate a file including area information specifying the area, converted character area image information obtained through the conversion, and subject image information obtained through the encoding.

16. An image processing apparatus to reproduce a captured subject image on the basis of a file including area information specifying an area including a character extracted from the captured subject image, converted character area image information obtained by converting a character area image in the area, and subject image information obtained by encoding the subject image, the image processing apparatus comprising:
　a decoding unit configured to decode the subject image information in accordance with a first predetermined method;
　a reading unit configured to read the area information and the converted character area image information from the file;
　a converting unit configured to convert the read converted character area image information in accordance with a second predetermined method;
　an overwriting unit configured to overwrite the area in the subject image obtained by the decoding with the character area image that has been restored to an original state by converting the converted character area image information in accordance with the read area information; and
　a display control unit configured to control display of the subject image in which overwriting with the character area image has been performed on a screen.

* * * * *